US011089356B2

(12) United States Patent
Gupta et al.

(10) Patent No.: US 11,089,356 B2
(45) Date of Patent: Aug. 10, 2021

(54) SYSTEMS AND METHODS FOR MEDIA CONTENT HAND-OFF BASED ON TYPE OF BUFFERED DATA

(71) Applicant: Rovi Guides, Inc., San Jose, CA (US)

(72) Inventors: Vikram Makam Gupta, Bangalore (IN); Muni Ramaiah Bandham, Bangalore (IN); Santhiya Krishnamoorthi, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/365,262

(22) Filed: Mar. 26, 2019

(65) Prior Publication Data

US 2020/0314481 A1 Oct. 1, 2020

(51) Int. Cl.
*H04N 21/436* (2011.01)
*H04N 21/235* (2011.01)
*H04N 21/60* (2011.01)
*H04N 21/81* (2011.01)
*H04N 21/442* (2011.01)
*H04N 21/414* (2011.01)
*H04W 36/00* (2009.01)

(52) U.S. Cl.
CPC ..... *H04N 21/436* (2013.01); *H04N 21/41407* (2013.01); *H04N 21/44204* (2013.01); *H04W 36/03* (2018.08)

(58) Field of Classification Search
CPC .......................... H04N 21/234; H04N 21/235
See application file for complete search history.

(56) References Cited

U.S. PATENT DOCUMENTS

| | | | |
|---|---|---|---|
| 6,961,954 B1 | 11/2005 | Maybury et al. |
| 7,068,597 B1 | 6/2006 | Fijolek et al. |
| 8,032,589 B2 | 10/2011 | Foti |
| 8,094,997 B2 | 1/2012 | Huang et al. |
| 8,122,474 B2 | 2/2012 | Tecot et al. |
| 8,296,797 B2 | 10/2012 | Olstad et al. |
| 8,326,126 B2 | 12/2012 | Godtland et al. |
| 8,386,935 B2 | 2/2013 | Van et al. |
| 8,572,257 B2 | 10/2013 | Dua |
| 8,813,166 B2 | 8/2014 | Howarter et al. |
| 8,931,016 B2 | 1/2015 | Hao et al. |

(Continued)

FOREIGN PATENT DOCUMENTS

WO WO 2010133599 11/2010
WO WO 2011001259 1/2011

(Continued)

OTHER PUBLICATIONS

U.S. Appl. No. 16/365,258, filed Mar. 26, 2019, Vikram Makam Gupta.

*Primary Examiner* — Mushfikh I Alam
(74) *Attorney, Agent, or Firm* — Haley Guiliano LLP

(57) ABSTRACT

Systems and methods are disclosed for handing off media content. A media player client receives a request to transfer a media stream, which is playing on a first media device, to a second media device. In response to determining that the second media device comprises a larger screen than the first media device, the media player content determines, based on the genre and resolution of the media stream data, whether the media stream data can be transferred, from the first media device to the second media device.

20 Claims, 14 Drawing Sheets

(56) References Cited

U.S. PATENT DOCUMENTS

| | | | |
|---|---|---|---|
| 9,257,149 B2 | 2/2016 | Wilson et al. | |
| 10,110,963 B1 | 10/2018 | Michel et al. | |
| 10,306,174 B1* | 5/2019 | Grafton | H04N 5/4403 |
| 10,542,315 B2* | 1/2020 | Shaw | H04N 21/812 |
| 2002/0197053 A1 | 12/2002 | Nakamura et al. | |
| 2007/0039032 A1* | 2/2007 | Goldey | H04N 21/2665 |
| | | | 725/114 |
| 2007/0212028 A1* | 9/2007 | Naito | H04N 21/42646 |
| | | | 386/241 |
| 2008/0077965 A1* | 3/2008 | Kamimaki | H04N 21/4341 |
| | | | 725/105 |
| 2008/0126919 A1 | 5/2008 | Uskali et al. | |
| 2009/0004974 A1* | 1/2009 | Pyhalammi | G06F 9/44536 |
| | | | 455/67.11 |
| 2009/0165062 A1 | 6/2009 | Harris et al. | |
| 2009/0196339 A1* | 8/2009 | Hirabayashi | H04N 19/40 |
| | | | 375/240.01 |
| 2009/0300145 A1 | 12/2009 | Musayev et al. | |
| 2009/0317055 A1 | 12/2009 | Iwami | |
| 2010/0131995 A1 | 5/2010 | Guo et al. | |
| 2011/0022471 A1 | 1/2011 | Brueck et al. | |
| 2012/0030584 A1* | 2/2012 | Bian | G06F 9/451 |
| | | | 715/746 |
| 2012/0054808 A1 | 3/2012 | Nijim | |
| 2012/0062791 A1* | 3/2012 | Thakolsri | H04N 21/234363 |
| | | | 348/441 |
| 2013/0091528 A1* | 4/2013 | Honda | H04N 21/254 |
| | | | 725/85 |
| 2013/0347044 A1 | 12/2013 | Lee et al. | |
| 2014/0068090 A1* | 3/2014 | Wang | H04N 21/64322 |
| | | | 709/227 |
| 2015/0020127 A1* | 1/2015 | Doshi | H04N 21/47202 |
| | | | 725/88 |
| 2015/0033277 A1 | 1/2015 | Li et al. | |
| 2015/0082347 A1 | 3/2015 | Pan | |
| 2015/0143436 A1 | 5/2015 | Gibbon et al. | |
| 2015/0178032 A1* | 6/2015 | Gantman | H04N 21/43637 |
| | | | 345/520 |
| 2015/0264299 A1* | 9/2015 | Leech | G06F 3/013 |
| | | | 348/78 |
| 2016/0057475 A1 | 2/2016 | Liu | |
| 2016/0092152 A1* | 3/2016 | Portugal | G06F 3/147 |
| | | | 345/2.1 |
| 2016/0109978 A1* | 4/2016 | Chung | G06F 3/0481 |
| | | | 345/174 |
| 2016/0188902 A1* | 6/2016 | Jin | H04W 4/029 |
| | | | 726/28 |
| 2016/0191626 A1 | 6/2016 | Wang | |
| 2016/0261904 A1 | 9/2016 | Qian et al. | |
| 2017/0127141 A1 | 5/2017 | Yin | |
| 2018/0146020 A1 | 5/2018 | McClure | |
| 2020/0029107 A1 | 1/2020 | Dunker et al. | |
| 2020/0195994 A1* | 6/2020 | Eluvan | H04N 21/25825 |

FOREIGN PATENT DOCUMENTS

| | | |
|---|---|---|
| WO | WO 2014154108 | 10/2014 |
| WO | WO 2015172320 | 11/2015 |
| WO | WO 2018080447 | 5/2018 |

\* cited by examiner

SYSTEMS AND METHODS FOR MEDIA CONTENT HAND-OFF BASED ON TYPE OF BUFFERED DATA

BACKGROUND

The present disclosure is directed to media player clients, and more particularly to media player clients in which local media content is transferred between media devices.

SUMMARY

Mobile devices allow digital content to travel with users as they move from one location to another. Advancements in device communication additionally allow users to share media across multiple devices. Thus, a user may begin consuming media on one device at a certain location and complete consumption on a different device at a different location. Unfortunately, the transition of consumption (i.e., media handoff) between devices can be subject to delays and is not a seamless experience. One approach to handing off media between two devices involves using a middle server that transmits a stream of the media. A connection is established between the server and a first device, and streaming is initiated. When the user opts to consume the media on a second device, a second connection is established between the server and the second device. Due to streaming latency and delays in establishing connections with the server, the transition of consumption from the first device to the second device is not immediate in this approach. In order to mitigate this issue, while the server connection is being established with the second device, a media player client should send local data, stored on the first device, to the second device over a separate device-to-device connection, thus providing the user with quicker access to the media stream.

Systems and methods are described herein for handing off media using media stream data stored on a first device. In one embodiment, a media player client on a first media device receives a media stream from a server and generates the media stream for display using the first media device. The media player client may receive a request to transfer the media stream to a second media device. In response to receiving the request, the media player client utilizes the media stream data locally stored on the first media device to produce a summary of the media stream. The summary is transferred to the second media device from the first media device.

In some embodiments, the media stream is received from the server via the Internet and the summary is transferred to the second media device via a local network. As the file size of the summary of the media stream data may be smaller than the actual media stream, and the local network connection may be pre-established between the respective media devices, the summary is accessible to the second media device before receipt of the actual media stream from the server. This accessibility reduces the wait time of the user for accessing content on the second media device in response to the transfer request.

The media player client may then generate the summary for display on the second media device. In some embodiments, when the media stream is ready to be generated for display on the second media device (e.g., a connection between the second media device and the server is established and the server has begun transmitting the media stream to the second media device), the media player client ceases displaying the summary and generates the media stream as received from the server for display on the second media device.

The summary serves as a bridge for the user between consuming the media stream on the first media device and consuming the media stream on the second media device. The delay between the user's request to transfer display of the media stream to the second media device and the actual display of the media stream on the second media device may be a time period in which the user stops use of the first media device and waits for the media stream to be displayed on the second media device. Rather than sitting idle, the user can be provided with the summary to alleviate the break in immersion in the media stream during the transfer. Accordingly, the summary is produced by the media player client to be inserted in the waiting period. In some embodiments, the media player client receives latency data of a connection between the server and the second media device. Based on the latency data, the media player client estimates a period of time between the request to transfer the media stream to the second media device and the receipt of the media stream from the server at the second media device. The media player client creates a summary that has a duration equal to the estimated period of time. In some embodiments, the media player client bases the estimation of the period of time on historical data indicating the average length of time between historical requests to transfer media streams to the second media device.

The reliance on media stream data locally stored on the first media device to create the summary is to provide content to the second media device without the need for a middle server. When receiving the media stream from the server at the first media device, the media player client stores the media stream in a buffer. In typical streaming conditions, the buffer comprises content that the user has already viewed in a particular viewing session along with a next set of frames that the user will view. Because the media stream data is already stored on the first media device, it does not need to be redownloaded on the second media device and can instead be used to provide content to the user while the second media device establishes a connection with the server.

In some embodiments, the media player client creates the summary by selecting frames from a plurality of frames stored in the buffer of the first device and concatenating the selected frames. The media player client may additionally classify the plurality of frames into a plurality of segments. The media player client may then identify segments that are marked important based on metadata of the media stream and include the identified segments in the summary.

In order to ensure a quick transition of consumption, the media player client may not immediately cease displaying the media stream on the first media device. For example, in response to receiving the request to transfer the media stream to the second media device, the media player client may identify a playback position in the media stream where the current scene of the media stream ends or a moment of silence occurs. The media player client may continue displaying the media stream on the first media device until the playback position is reached. In some embodiments, the media player client displays the media stream on the first media device until the summary is generated for display on the second media device.

The display resolution of the media stream is an important consideration in the handoff process. In a scenario in which the first media device is a smartphone with a 4.6-inch display and the second media device is a smart TV with a 50-inch display, the viewing experience for a user may differ depending on the resolution of the media stream data that is to be transferred from the first media device to the second media device. As larger television displays tend to have lower pixel densities than smaller smartphone displays, even if the display resolution on both displays is the same (e.g., 1080 pixels), the visuals of the media stream may appear degraded on the television display depending on the viewing distance of the user. This feature is even more prominent if the native resolution of the television is higher than the native resolution of the smartphone display. For example, the smartphone display may have a display resolution of 720 p and the display resolution of the television may be 4K. Accordingly, viewing a 720-pixel stream on a 4K television may be less than ideal if the same media stream is accessible in 4K from the server.

Systems and methods are thus described herein for handing off media based on the genre of the media stream data stored on a first device. Although viewing a 720-pixel stream on a 4K television may be less than ideal, not all scenes appear degraded if the genre of the scene is considered. Drama scenes, for example, tend to feature close-up shots of actors and require less visual clarity than highly detailed action scenes. Thus, viewing a dramatic close-up in 720 p on a 4K television may not break the user's immersion in viewing the media stream.

In one embodiment, the media player client receives a media stream in a first resolution at the first media device from a server and generates the media stream for display. In response to receiving a request to transfer the media stream to a second media device, the media player client determines whether the second media device has a larger display screen than the first media device. In response to determining that the second media device does have a larger display screen than the first media device, the media player client retrieves a list of genres that do not need to be played at a second resolution that is higher than the first resolution. In some embodiments, the second resolution is associated with the display of the second media device. For example, the first resolution may be 720 p, whereas the second resolution may be 4K. In response to determining that media stream data stored on the first media device (e.g., the data in a buffer) is associated with a genre that is included in the list, the media player client transfers the media stream data in the first resolution to the second media device. This allows the user to have quicker access to the media stream without significantly compromising display quality.

In some embodiments, the media player client displays the media stream data in the first resolution on the second media device. When the media stream is ready to be generated for display on the second media device, the media player client ceases displaying the media stream data in order to display the media stream in the second resolution.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
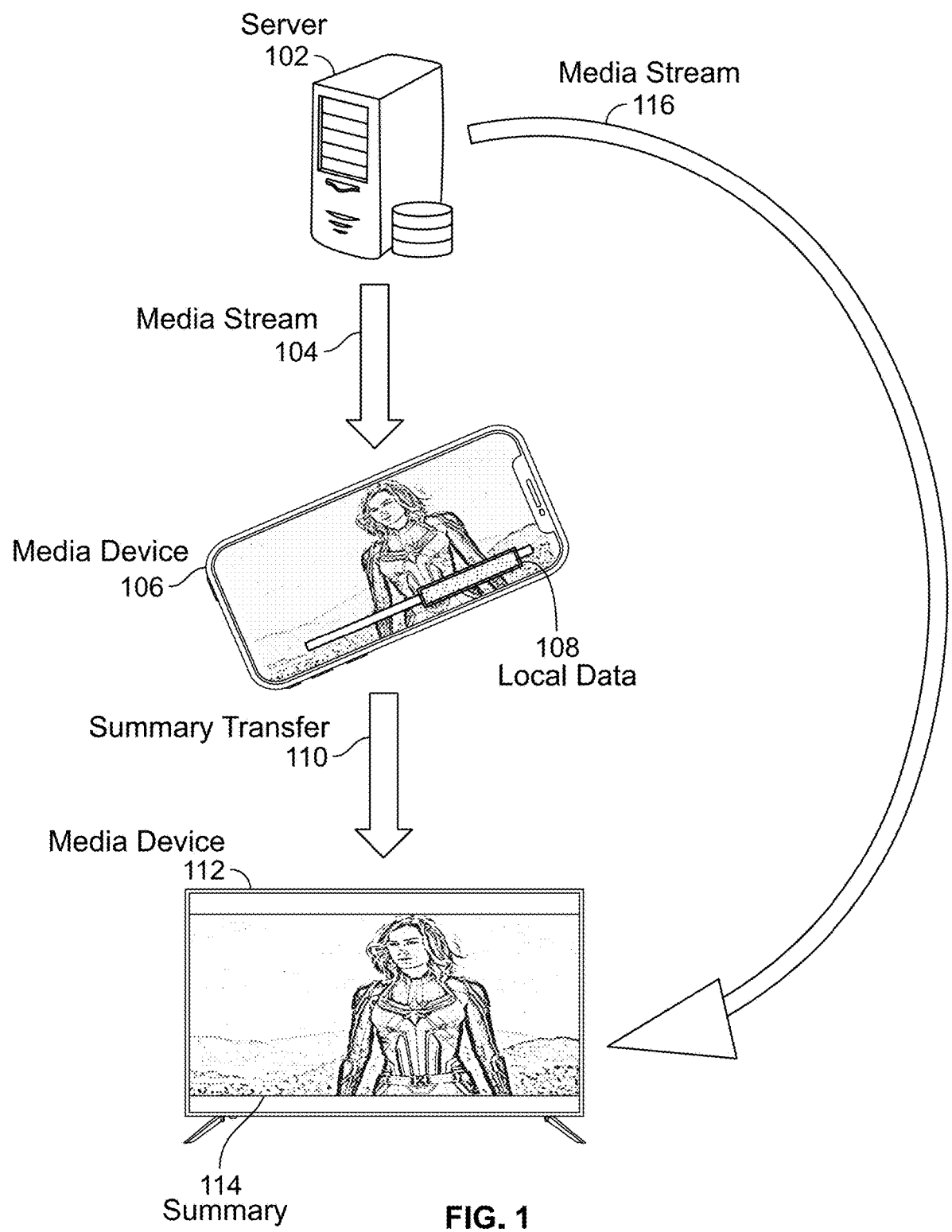
FIG. 1 shows an illustrative example of a media content handoff in which a summary is transferred from a first media device to a second media device, in accordance with some embodiments of the disclosure.

FIG. 1 shows illustrative example 100 of a media content handoff in which a summary is transferred from a first media device to a second media device, in accordance with some embodiments of the disclosure. Server 102 is depicted as a media content source that sends media stream 104 to a smartphone device. For example, a user may access a trailer of the movie "Captain Marvel" on media device 106's (e.g., a smartphone) YouTube mobile application. Because media device 106 is streaming the trailer from server 102, the media stream data (e.g., local data 108) of the trailer is downloaded and presented on media device 106 simultaneously.

Media device 106 may then receive a request to transfer media stream 104 to media device 112 (e.g., a smart television). For example, the user may decide to complete viewing the trailer on a larger screen. An approach to performing the transfer may be to simply cease displaying media stream 104 on media device 106 in order to establish a network connection between server 102 (or any alternate content server) and media device 112, ultimately initiating a new stream of the trailer. As discussed previously however, depending on the strength and speed of the Internet connection of media device 112, the transfer can be a slow process. Illustrative example 100 thus provides the user with a summary of media stream 104 while media device 112 establishes a connection with the content server, to preserve the user's immersion in media stream 104. The summary of media stream 104 (e.g., summary 114) is created by media device 106 using local data 108 which comprises playback information already downloaded on media device 106. The summary generation process is discussed in further detail in the description of FIG. 2.

Summary transfer 110 represents communication between media device 106 and media device 112 via a pre-established connection (e.g., over local area network) that is wired or wireless. For example, media device 106 may create and send summary 114 to media device 112 using an intranet or a communication standard such as Bluetooth. Because summary transfer 110 occurs on a pre-established network, summary 114 can be streamed directly to media device 112 while media device 112 establishes a connection with server 102. In response to determining that the connection between server 102 and media device 112 is established, the media player client on media device 112 may cease playback of summary 114 in order to generate media stream 116 for display. Media stream 116 may resume playback at a time position where the user left off on media device 106. It should be noted that summary 114 may be created (e.g., by concatenating segments) on any device that is connected to both media device 106 and media device 112 over the same network. In some embodiments, the smart phone transfers local data 108 to media device 112, and the media player client on media device 112 creates summary 114 based on local data 108.

Figure 2:
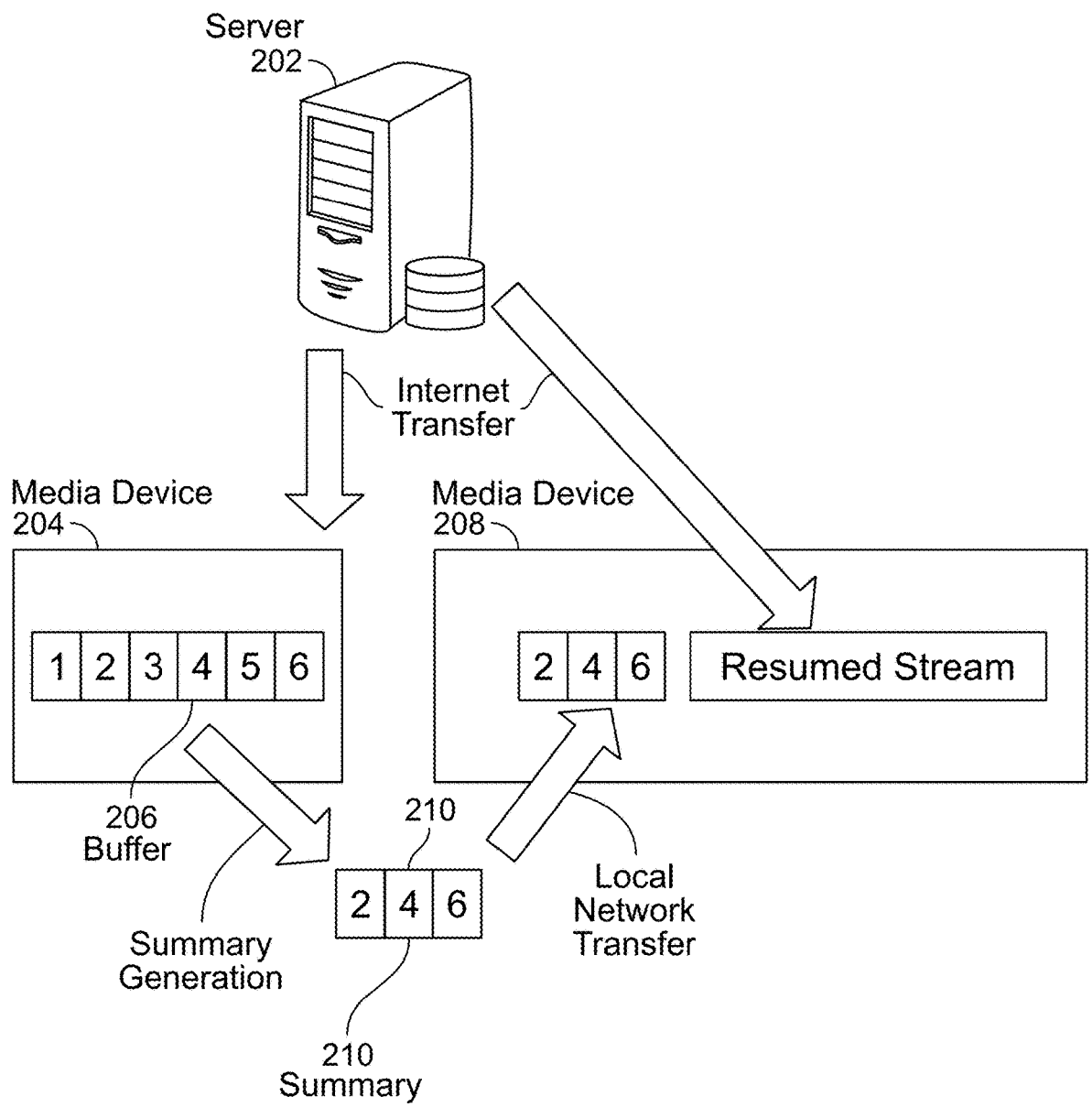
FIG. 2 shows an illustrative example of generating the summary of the media stream data, in accordance with some embodiments of the disclosure.

FIG. 2 shows illustrative example 200 for generating the summary of the media stream data, in accordance with some embodiments of the disclosure. Media device 204 and media device 208 of FIG. 2 are analogous to media device 106 and media device 112 of FIG. 1, respectively. Media device 204 displays the media stream, as received from server 202 (e.g., over the Internet), and stores buffer 206 featuring six segments of the media stream. Each segment in buffer 206 may comprise a plurality of frames of a particular scene in the media stream and may have a certain duration (e.g., 10 seconds). Segments 1-6 in buffer 206 may have been viewed by the user prior to the request to transfer.

During summary generation, the media player client of media device 204 selects a subset of segments from buffer 206 for concatenation. For example, the media player client is shown to select segments 2, 4 and 6 from buffer 206 to create summary 210. If each segment is 10 seconds in duration, the duration of summary 210 is 30 seconds. In some embodiments, the media player client may determine the length of time between requesting a transfer and generating the resumed stream on media device 208. During summary generation, the media player client thus selects segments from buffer 206 that add up to a duration equal to the determined length of time. This is further discussed in the description of FIG. 9.

The media player client transfers summary 210 over network connection from media device 204 to media device 208. Media device 204 additionally provides playback information to server 202. This information includes an identifier of the media stream, a destination address of media device 208 (e.g., a MAC address), a playback position at which the media stream ceased playback on media device 204, and viewing preferences of the user (e.g., closed captioning, volume settings, etc.). The media player client on media device 208 generates summary 210 for display. Simultaneously, server 202 initiates communication with media device 208 based on the destination address provided by media device 204. In some embodiments, media device 208 initiates communication with server 202. In response to receiving media device 208's acknowledgment of the communication, server 202 begins streaming the media stream to media device 208 from the playback position. Server 202 additionally transfers the viewing preferences of the user to media device 208. When summary 210 ceases display on media device 208, the media player client of media device 208 generates the resumed stream for display in accordance with the viewing preferences at the playback position.

Figure 3:
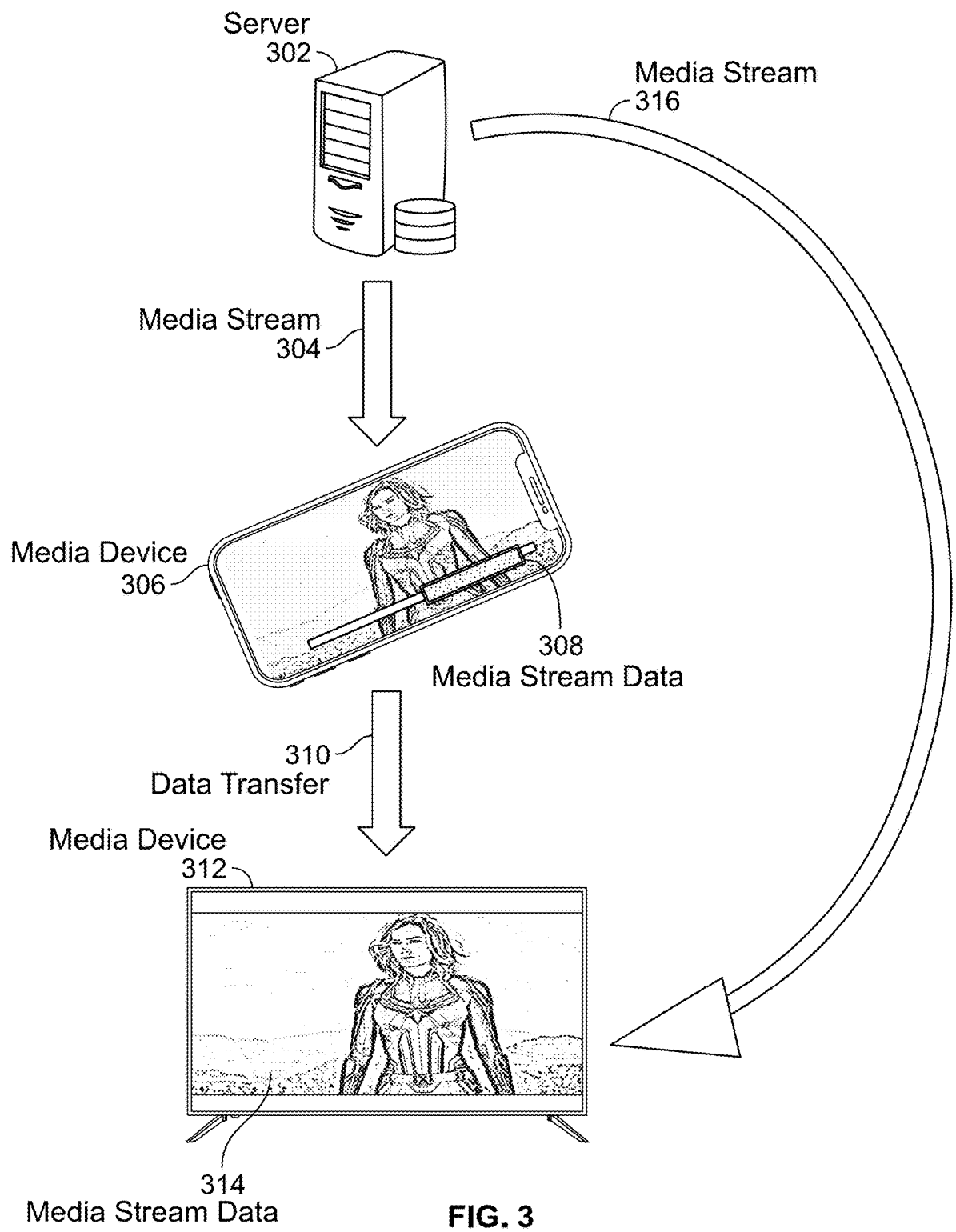
FIG. 3 shows an illustrative example of a media content handoff in which media stream data is transferred in a first resolution from a first media device to a second media device, in accordance with some embodiments of the disclosure.

FIG. 3 shows illustrative example 300 of a media content handoff in which media stream data is transferred in a first resolution from a first media device to a second media device, in accordance with some embodiments of the disclosure. Similar to illustrative example 100, FIG. 3 features server 302, which transmits media stream 304 to media device 306. Media device 306 then receives a request to transfer media stream 304 to media device 312. In an ideal streaming situation, the streaming rate at which media stream data 308 is downloaded to media device 306 is greater than the playback speed of media stream 304. This ensures that the user does not witness lags or stops in viewing media stream 304. In illustrative example 300, media stream 304 may have a duration of one minute and the user may be halfway through playback (e.g., playback position of 30 seconds). Furthermore, the streaming rate may be high enough such that the next 10 seconds of media stream 104 are included in the media stream data along with the first 30 seconds that the user has already viewed.

In an approach where the transfer is performed by ceasing display of media stream 304 and creating an independent streaming session between server 302 and media device 312, the bandwidth utilized for downloading the media stream data to media device 306 is wasted because the media stream data is discarded. This is especially concerning when the media stream data on media device 306 includes playback information that media device 312 will download anyway (e.g., the 10 seconds buffered of the trailer). Illustrative example 300 thus transfers media stream data 308 from media device 306 to media device 312 via data transfer 310 (e.g., communication over a pre-established connection). In some embodiments media stream data 308 contains playback information only for the unviewed segments buffered on media device 306. For example, rather than sending 40 seconds of media stream 304, the media player client on media device 306 sends the 10-second segment that the user has yet to view. The media player client on media device 312 can thus use this 10-second segment to generate a portion of media stream 304 while media device 312 establishes a connection with a content server (e.g., server 302).

It should be noted that data transfer 310 can be performed using communication standards such as Bluetooth and Wi-Fi Direct. Bluetooth 4.0 is capable of device-to-device transfer rates up to 25 Mbps and Wi-Fi Direct is capable of transfer rates up to 250 Mbps. If the network connection between media device 312 and server 302 has a download speed less than these speeds (e.g., 3 Mbps), the user can expect to wait for media stream 316 to become available for view on media device 312. As media stream 308 is accessible more quickly, bandwidth is efficiently utilized because media device 312 does not have to redownload the segments over a potentially slower connection. The media player client on media device 312 may process media stream data 308 (e.g., perform transcoding operations) to generate the media stream for display. The processed media stream data is labeled as media stream data 314.

Figure 4:
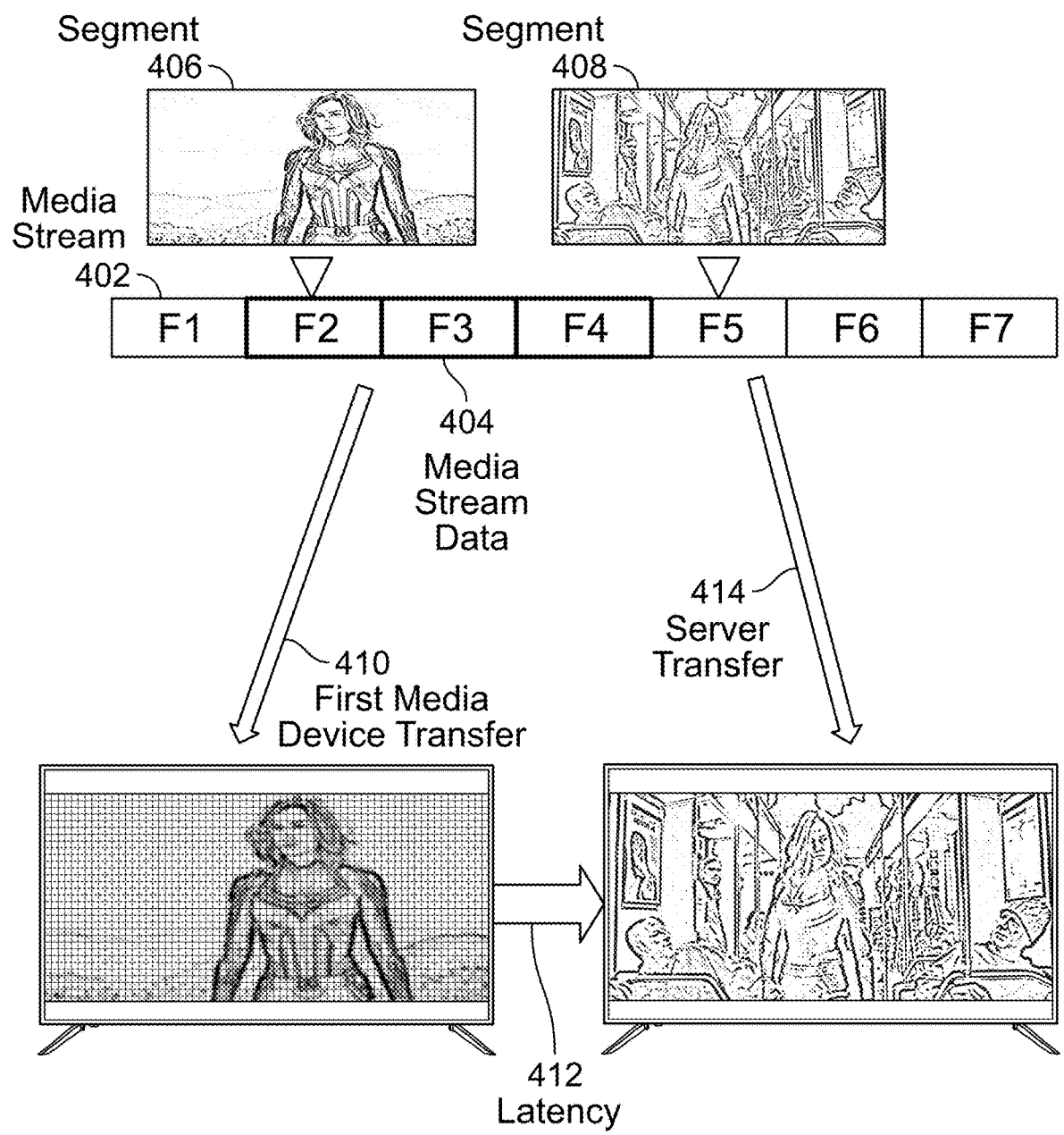
FIG. 4 shows an illustrative example of transferring media stream data in a first resolution and subsequently playing the original stream in a second resolution when connection with a server is established at the second media device, in accordance with some embodiments of the disclosure.

FIG. 4 shows illustrative example 400 for transferring media stream data in a first resolution and subsequently playing the original stream in a second resolution when connection with a server is established at the second media device, in accordance with some embodiments of the disclosure. As mentioned previously, simply transferring media stream data may be deficient if the data cannot be used to display the media stream with a sufficient resolution for the receiving media device. Referring to FIG. 3, media device 306 is depicted as a smartphone and media device 312 is depicted as a smart television. The display size of the smartphone screen is smaller than the display size of the smart television screen. Because smart televisions are viewed from a distance larger than the distance at which a smartphone is viewed, the pixel density on the smart television is typically lower than the latter. Although both media devices may be capable of outputting video at the same resolution, due to the pixel densities of the respective devices and the viewing distances of the user, a video may appear significantly sharper on the smaller screen. This is specifically noticeable when the video features an abundance of colors, smaller and detailed objects, and quick movements.

A goal of the systems and methods disclosed is to quickly provide the user with content. Rather than expending time and processing to determine pixel densities, resolutions, and visual content in the media stream, the media player client may consider broader factors to classify whether to transfer media stream data. For example, pixel density and resolution can be attributed to the display size of a media device because larger screens tend to have lower pixel densities and higher resolution capabilities than smaller screens. In terms of visual features, the genre of a segment can provide an indication of the type of visuals in each frame. For example, the action genre generally features busy frames, filled with small visual objects and quick changes in pixel output. Accordingly, action genre segments can benefit from an upscale in resolution and would not be good segments to transfer as a low-resolution buffer to a larger screen. It is highly likely that a user viewing a low-resolution action scene may simply wait for the display of the high-resolution media stream and re-watch the segment transferred. Therefore, action genre segments are not transferred. Drama genre segments on the other hand generally feature close-ups of actors and fewer changes in visual content; segments of the drama genre are good candidates for transferring buffers because visual details even in low-resolution videos are discernable.

Illustrative example 400 takes place when the media player client determines that media device 312 has a larger screen than media device 306. Up until this point, media device 306 may be receiving media stream 304 in a 720-pixel resolution when a request to transfer media stream 304 may be received from the user. In response to determining that media device 312 has a larger screen than media device 306, the media player client retrieves a list of genres from memory. The list of genres includes genres that do not need to be played at a higher resolution than the current resolution (e.g., 720 p). For example, the list of genres may include "drama," "romance," and "comedy."

Media stream 402 represents the "Captain Marvel" trailer introduced in the previous examples. Media stream 402 comprises seven segments: F1, F2, F3, F4, F5, F6, and F7. Media stream data 404 may specifically comprise segments F2, F3, and F4, which have yet to be viewed by the user. Each segment represents a scene in media stream 402. For example, F2 represents segment 406, which is a dramatic portrait of a character in the trailer. F5 represents segment 408, which is an action scene featuring multiple characters and movements.

The media player client determines the genre of each segment in media stream data 404. For example, the media player client may retrieve metadata associated with the content from server 302. The metadata may indicate how the segments are split up in media stream 402, the length of each segment, and characteristics of each segment. The characteristics of a segment include subtitle information, cast information, and genre classification. Based on the metadata, the media player client may determine that segments F2, F3, and F4 are all associated with the "drama" genre. As this genre is included in the list of genres that do not need to be upscaled to a higher resolution than 720 p, the media player client can appropriately utilize media stream data 404 for display on media device 312.

In response to determining that media stream data 404 is associated with a genre that is present in the list of genres, first media device transfer 410 is performed (equivalent of data transfer 310). The media player client additionally considers latency 412, which is the time between the receipt of the request to transfer and the generation of media stream 402 on media device 312. Latency 412 is further discussed in the descriptions of FIG. 9 and FIG. 10. In response to receiving media stream data 404, the media player client on media device 312 generates media stream data 404 for display. Simultaneously, media device 312 establishes a connection with server 302 to initiate server transfer 414. Server transfer 414 is a stream of media stream 402 to media device 312 starting from segment F5. Thus, when playback of segments F2, F3, F4 is complete, the media player client can display media stream 402 starting from segment F5, allowing for a seamless viewing experience.

In some embodiments, the media player client may delay playback of media stream data 404 on media device 312 until a seamless transition between F4 and F5 can be achieved. For example, latency 412 may be 50 seconds, depending on the transfer rates between media device 312 and server 302. Media stream data 404 may be 30 seconds in duration. Accordingly, a 20-second gap may occur between playback completion of segment F4 and playback initiation of segment F5. A viewing experience in which the user watches a segment and waits for 20 seconds for the next segment is prone to breaking user immersion in the media stream. The media player client may thus wait approximately 20 seconds (accounting for the time it takes to transfer media stream data 404 to media device 312) from the time a transfer request is received at media device 306 before beginning playback of media stream data 404 on media device 312. This allows for segment F5 to be played immediately after playback completion of segment F4. In some embodiments, the media player client inserts a summary (as discussed in FIG. 2) into the 20-second gap. For example, in response to determining that latency 412 is greater than the duration of media stream data 404 by 20 seconds, the media player client may create a 20-second summary featuring frames from segment F1.

Figure 5:
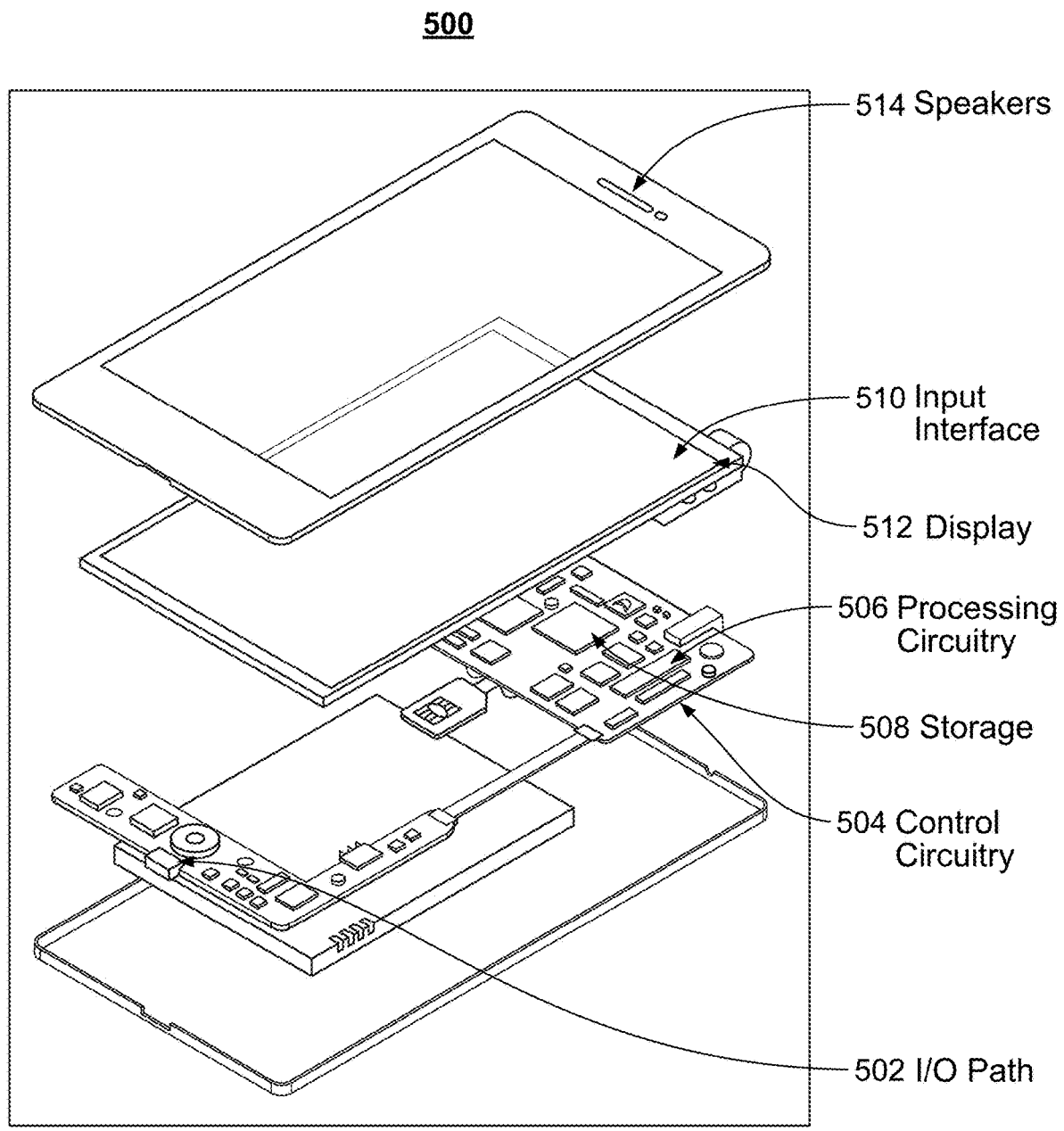
FIG. 5 is a diagram of an illustrative media device, in accordance with some embodiments of the disclosure.

FIG. 5 shows a generalized embodiment of illustrative media device 500. As referred to herein, the phrase "media device" should be understood to mean any device that can process or output digital content. As depicted in FIG. 5, media device 500 is a smartphone. However, media device 500 is not limited to smartphones and may be any computing device. For example, media device 500 of FIG. 5 can be implemented in system 600 of FIG. 6 as media device 602 (e.g., a smartphone, a video game console, a smart television, a computer, or any combination thereof).

Media device 500 may receive data via input/output (hereinafter "I/O") path 502. I/O path 502 may provide received data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications path (described below). I/O functions may be provided by one or more of these communication paths but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media player client stored in memory (i.e., storage 508).

A media player client may be a stand-alone application implemented on a media device or a server. The media player client may be implemented as software or a set of executable instructions. The instructions for performing any of the embodiments discussed herein of the media player client may be encoded on non-transitory computer readable media (e.g., a hard drive, random-access memory on a DRAM integrated circuit, read-only memory on a BLU-RAY disk, etc.) or transitory computer readable media (e.g., propagating signals carrying data and/or instructions). For example, in FIG. 5 the instructions may be stored in storage 508, and executed by control circuitry 504 of a media device 500.

In some embodiments, a media player client may be a client-server application where only the client application resides on media device 500 (e.g., media device 602), and a server application resides on an external server (e.g., server 606). For example, a media player client may be implemented partially as a client application on control circuitry 504 of media device 500 and partially on server 606 as a server application running on control circuitry. Server 606 may be a part of a local area network with media device 602, or may be part of a cloud computing environment accessed via the Internet. In a cloud computing environment, various types of computing services for generating the summary of the media stream, performing searches on the Internet or informational databases, providing storage (e.g., for the media stream) or parsing data are provided by a collection of network-accessible computing and storage resources (e.g., server 606), referred to as "the cloud." Media device 500 may be a cloud client that relies on the cloud computing capabilities from server 606 to create the summary of the media stream data for the media player client. When executed by control circuitry of server 606, the media player client may instruct the control circuitry to generate the media player client output (e.g., the summary) and transmit the generated output to media device 602. The client application may instruct control circuitry of the receiving media device 602 to generate the media player client output. Alternatively, media device 602 may perform all computations locally via control circuitry 504 without relying on server 606.

Control circuitry 504 may include communications circuitry suitable for communicating with a media player client server or other networks or servers. The instructions for carrying out the above-mentioned functionality may be stored and executed on server 606. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths. In addition, communications circuitry may include circuitry that enables peer-to-peer communication of media devices, or communication of media devices in locations remote from each other.

Memory may be an electronic storage device provided as storage 508 which is part of control circuitry 504. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Nonvolatile memory may also be used (e.g., to launch a boot-up routine and other instructions). Cloud-based storage (e.g., on server 606) may be used to supplement storage 508 or instead of storage 508.

A user may send instructions to control circuitry 504 using user input interface 510 of media device 500. User input interface 510 may be any suitable user interface touch screen, touchpad, stylus and may be responsive to external device add-ons such as a remote control, mouse, trackball, keypad, keyboard, joystick, voice recognition interface, or other user input interfaces. Display 510 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Speakers 514 may be provided as integrated with other elements of user equipment device 500 or may be stand-alone units. An audio component of the personalized answer and other content displayed on display 512 may be played through speakers 514. In some embodiments, the audio may be distributed to a receiver (not shown), which processes and outputs the audio via speakers 514.

Control circuitry 504 may allow a user to provide user profile information or may automatically compile user profile information. For example, control circuitry 504 may monitor a playback position of the media stream at which the user left off during the transfer to the second media device. Additionally, control circuitry 504 may obtain all or part of other user profiles that are related to a particular user (e.g., viewing histories), and/or obtain information about the user from other sources that control circuitry 504 may access. As a result, a user can be provided with a unified experience across the user's different media devices during the transfer.

Figure 6:
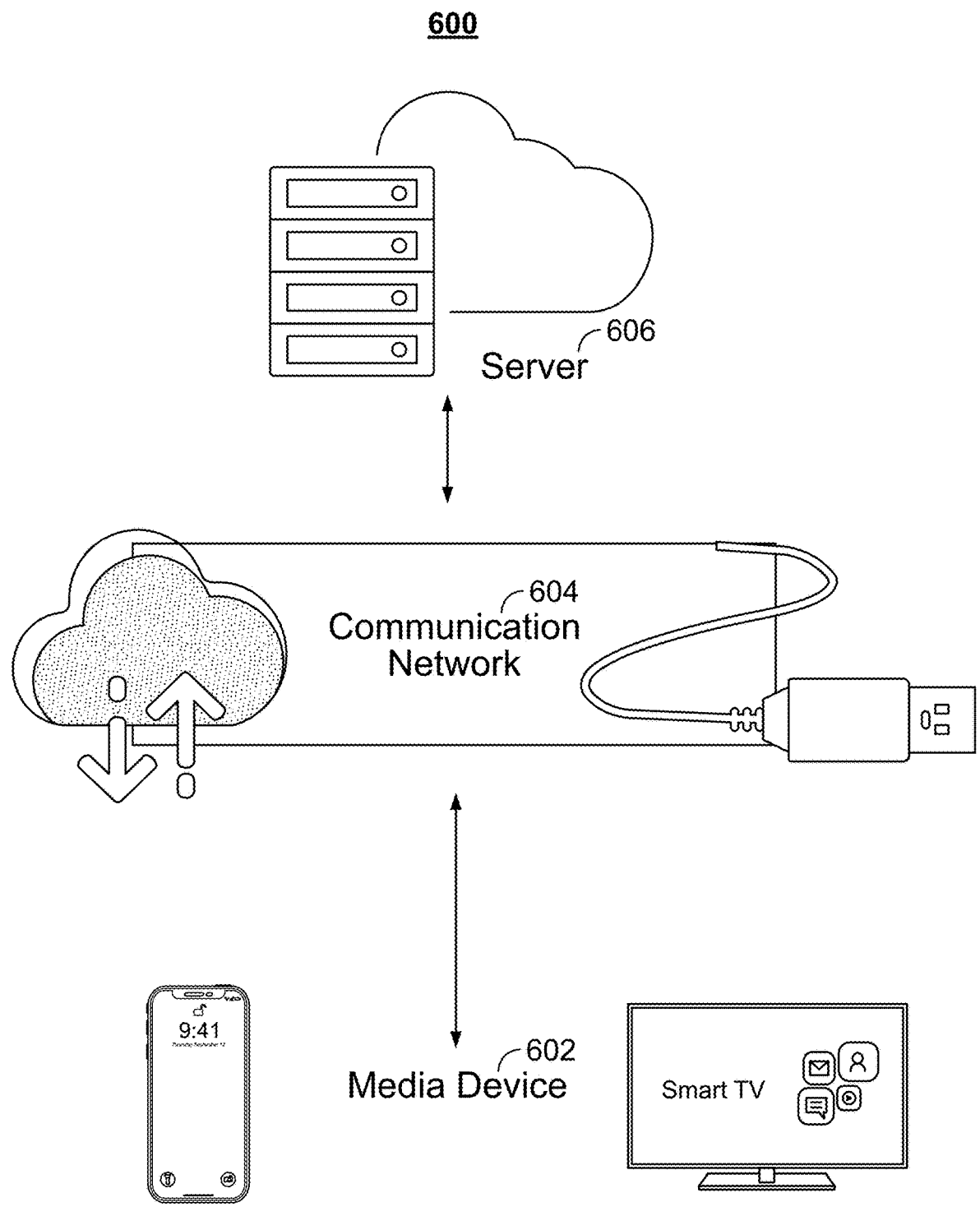
FIG. 6 is a diagram of an illustrative media system, in accordance with some embodiments of the disclosure.

As depicted in FIG. 6, media device 602 may be coupled to communication network 604. Communication network 604 may be one or more networks including the Internet, a mobile phone network, mobile voice or data network (e.g., a 4G or LTE network), cable network, public switched telephone network, Bluetooth, or other types of communication network or combinations of communication networks. Thus, media device 602 may communicate with server 606 over communication network 604 via communications circuitry described above. In should be noted that there may be more than one server 606, but only one is shown in FIG. 6 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communication path or combination of such paths.

Figure 7:
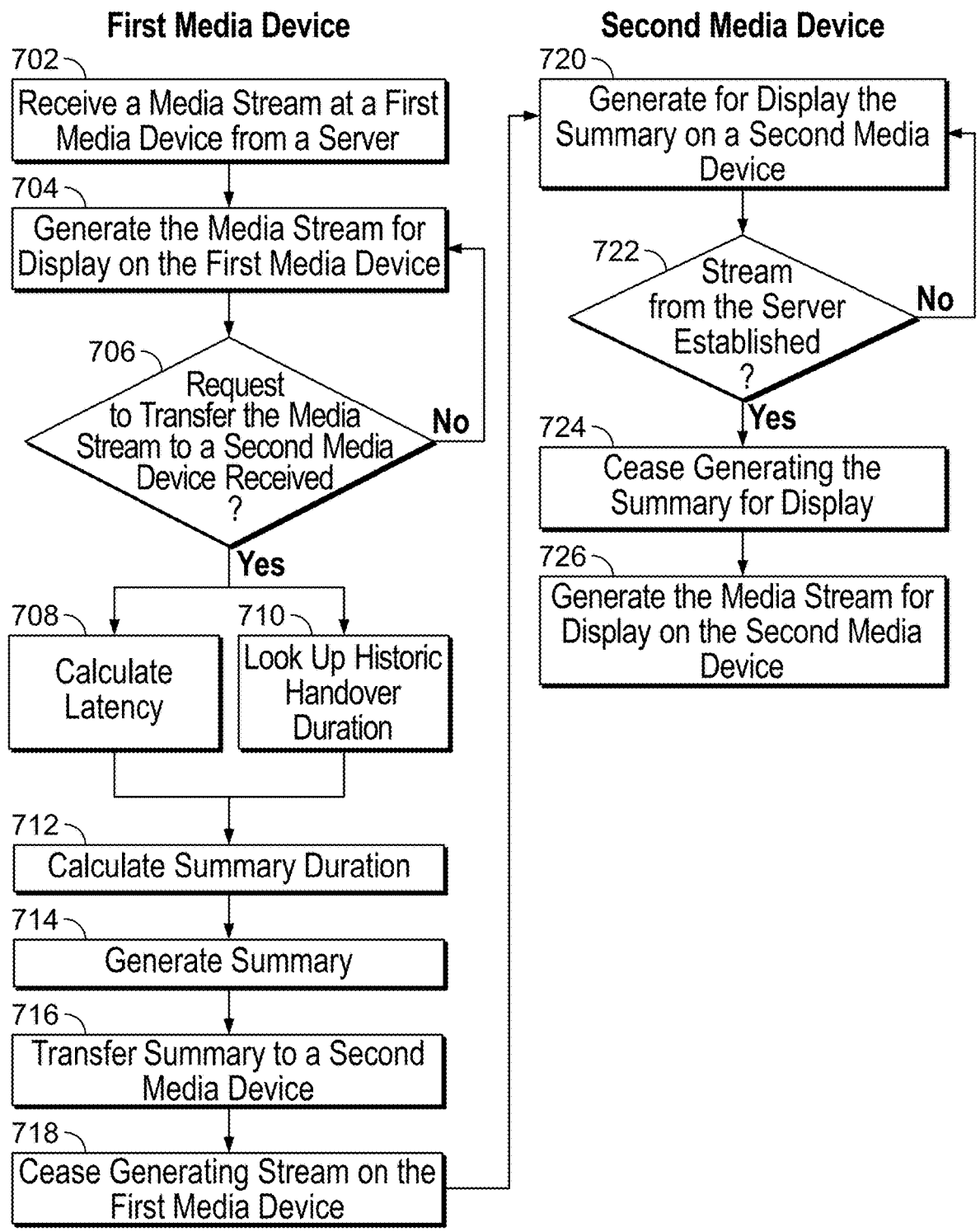
FIG. 7 is a flowchart of a detailed illustrative process for a media content handoff in which a summary is transferred from a first media device to a second media device, in accordance with some embodiments of the disclosure.
Figure 9:
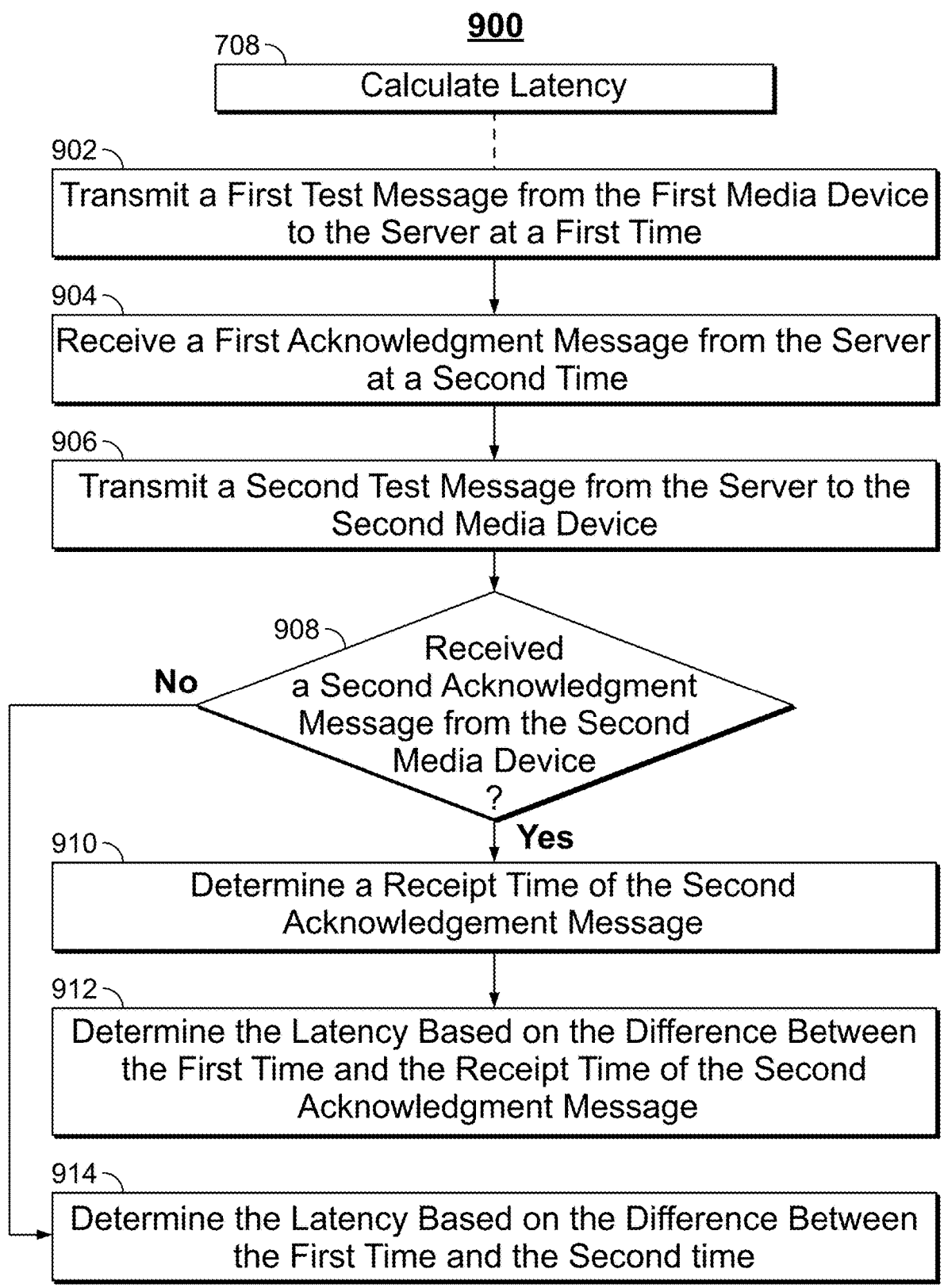
FIG. 9 is a flowchart of an illustrative process for determining latency between a transfer request at a first media device and establishing a connection of the second media device with the server, in accordance with some embodiments of the disclosure.

FIG. 7 is a flowchart of detailed illustrative process 700 for a media content handoff in which a summary is transferred from a first media device to a second media device, in accordance with some embodiments of the disclosure. At 702, control circuitry 504 of the first media device (e.g., media device 104) receives via I/O path 502 a media stream (e.g., media stream 104) from a server (e.g., server 102). For example, control circuitry 504 of a smartphone device receives a video, "Captain Marvel Trailer," from a YouTube server over an Internet connection. At 704, control circuitry 504 generates the media stream for display using display 512 and speakers 514. As 702 and 704 represent a streaming process, the first media device receives and displays the movie trailer concurrently. At 706, control circuitry 504 determines whether a request to transfer the media stream to a second media device (e.g., media device 112) has been received (e.g., via I/O path 502). For example, a user may be interested in transferring the display of the movie trailer from his/her smartphone to a smart television. In response to determining that the request has not been received, process 700 returns to 704. In response to determining that the request has been received, process 700 may proceed to either 708 or 710. 708 is directed to determining an expected latency and 710 is directed to determining a historic handover duration. In either case, control circuitry 504 determines the amount of time between the receipt of the request to transfer and the completion of the transfer. While 708 is an assessment of current network conditions, 710 is a determination of the duration using previous transfer times found in memory (e.g., storage 508). 708 is described in further detail in FIGS. 9 and 710 is described in further detail in FIG. 10.

At 712, control circuitry 504 calculates the duration of a summary. For example, control circuitry 504 may determine that the expected latency is 30 seconds. In order to bridge the time gap between ceasing display of the movie trailer on the smartphone and initiating display of the movie trailer on the smart television, control circuitry 504 would need to create a 30-second summary. Accordingly, control circuitry 504 sets the duration of the summary equal to the latency calculated in 708 or the historic handover duration determined in 710. At 714, given the duration of the summary, control circuitry 504 creates a summary using media stream data buffered in storage 508. For example, control circuitry 504 selects previously watched segments from the movie trailer that are already stored in the storage of media device 106 and concatenates them into a video. Summary generation is discussed in further detail in FIG. 8. At 716, control circuitry 504 transfers the summary to the second media device over communication network 604. It should be noted that this transfer is performed via a pre-established local network between the respective media devices. At 718, control circuitry 504 ceases generating the media stream for display on the first media device.

At 720, process 700 is shifted to the second media device as control circuitry 504 on the second media device generates for display the summary using display 512 and speakers 514. At 722, control circuitry 504 determines whether a stream between the server and the second media device has been established. For example, control circuitry 504 may determine whether the smart television has begun receiving frames from the movie trailer. In response to determining that the stream has been established, process 700 proceeds to 724, where control circuitry 504 ceases generating the summary for display. For example, control circuitry 504 may determine that the actual movie trailer can begin streaming at the smart television and thus the summary no longer needs to be displayed. If the stream has not been established, control circuitry 504 returns to 720 where the summary continues to be displayed. At 726, control circuitry 504 of media device 112 generates the media stream for display on the second media device. For example, control circuitry 504 may resume playback of the movie trailer on the smart television from the playback position where control circuitry 504 on the smartphone ceased displaying the movie trailer.

It should be noted that the delay determination and summary generation process may be performed on any device connected to the first media device and the second media device over a network connection (e.g., in a local area network), or on the second media device itself. For example, control circuitry 504 of the first media device may transfer media stream data to the second media device in response to receiving the request to transfer at 706. Accordingly, steps 708-714 can be performed at the second media device.

Figure 8:
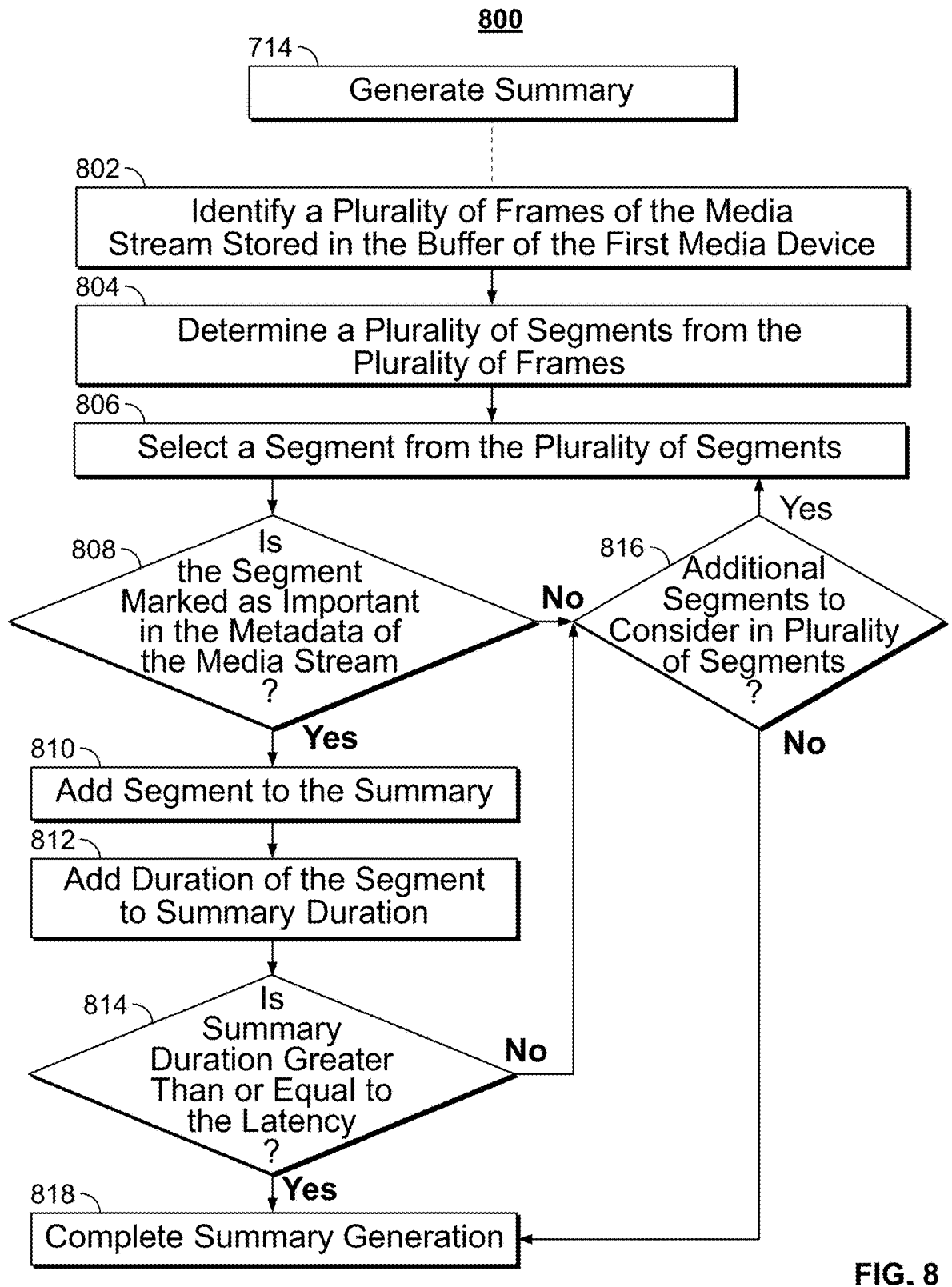
FIG. 8 is a flowchart of an illustrative process for generating a summary, in accordance with some embodiments of the disclosure.

FIG. 8 is a flowchart of illustrative process 800 for generating a summary, in accordance with some embodiments of the disclosure. Illustrative process 800 expands on 714 of FIG. 7. At 802, control circuitry 504 identifies a plurality of frames of the media stream stored in the buffer (e.g., storage 508) of the first media device. Referring back to FIG. 2, each segment of buffer 206 comprises several frames. At 804, control circuitry 504 determines a plurality of segments from the plurality of frames. For example, control circuitry 504 may group each frame in the plurality of frames into a segment (e.g., 1, 2, etc., of buffer 206 in FIG. 2) based on metadata information (retrieved by control circuitry 504 from server 606). The metadata of the movie trailer may provide durations for each segment, a start frame of each segment, an end frame of each segment, and an importance marker. Accordingly, control circuitry 504 may mark each frame in the plurality of frames as part of a particular segment.

At 806, control circuitry 504 selects a segment from the plurality of segments. For example, control circuitry 504 may select segment 1 of buffer 206. At 808, control circuitry 504 determines whether the selected segment is marked important in the metadata of the media stream. As mentioned previously, the metadata of the movie trailer may indicate whether a segment is important and should be shown. For example, the creator of the movie trailer for "Captain Marvel" may mark segments 2, 4, and 6 as key segments (e.g., marked as important). This indicates that segments 2, 4, and 6 have a higher priority than segments 1, 3 and 5. In this example, segment 1 is selected. In response to determining that the segment is not marked important, control circuitry 504 proceeds to 816 where control circuitry 504 determines whether there are additional segments to consider, which have not been processed in 808, in the plurality of segments. In this case, control circuitry 504 may determine that segments 2, 3, 4, 5 and 6 can still be selected. As a result, process 800 returns to 806 where control circuitry 504 selects the next segment, segment 2. In response to determining that a segment (e.g., segment 2) is marked important, process 800 proceeds to 810 where control circuitry 504 adds the selected segment to the summary. This simply means that control circuitry 504 takes the video and audio data of segment 2 and includes the data in the video file of the summary. At 812, control circuitry 504 adds the duration of the segment to the summary duration. For example, each segment in buffer 206 may be 10 seconds long and therefore the summary duration in this loop becomes 10 seconds.

At 814, control circuitry 504 determines whether the summary duration is greater than or equal to the latency. As discussed previously, the latency is the amount of time that control circuitry 504 has to cover with a summary in between the request to transfer and the generation of the media stream at the second media device. In this example, the latency may be 30 seconds. Because the 10-second summary length is less than the 30-second latency, control circuitry 504 loops back to 816. Suppose for example that in the following iterations of looping between 806 and 816, control circuitry 504 adds segments 4 and 6 into the summary (as they are marked important in the metadata). When returning to 814, control circuitry 504 would thus determine that the 30-second summary duration equals the 30-second latency. As described, process 800 loops between 806 and 816 until a summary of sufficient duration is produced or no additional segments are left to consider in the plurality of segments.

If there are additional segments to consider when the summary is not at a sufficient duration, control circuitry 504 may add segments not marked as important into the summary. For example, the latency may be 50 seconds. Therefore, two additional segments would be needed. In response to determining that additional segments can be added, control circuitry 504 adds segments 1 and 3 into the summary. Before concatenating the segments, control circuitry 504 may reorder the segments such that they are in chronological order (e.g., selected at 2, 4, 6, 1, 3 but reordered as 1, 2, 3, 4, 6).

FIG. 9 is a flowchart of an illustrative process for determining latency between a transfer request at a first media device and establishing a connection of the second media device with the server, in accordance with some embodiments of the disclosure. Process 900 elaborates on 708 of FIG. 7. At 902, control circuitry 504 transmits a first test message from the first media device to server 606 over communication network 604 (e.g., the Internet). The first test message is transmitted at a first time. Following the overarching example, the smartphone may assess the speed of the network connection between the smartphone and the server as well as between the server and the smart television by sending a test message with instructions to forward the test message to the smart television. At 904, control circuitry 504 of the first media device receives a first acknowledgment message from the server at a second time. For example, a smartphone may send the test message at 10:30:00 am (i.e., the first time) and at 10:30:10 am (i.e., the second time), the smartphone may receive a message from a server indicating that the test message has been received.

At 906, control circuitry 504 of server 606 transmits a second test message to the second media device over communication network 604 (e.g., the Internet). At 908, control circuitry 504 determines whether the second acknowledgment message has been received from the second media device in response to the second test message. For example, the server may forward the first test message to the smart television and await an acknowledgement message. In response to determining that the second acknowledgment message has been received, process 900 proceeds to 910, where control circuitry 504 of server 606 determines a receipt time of the second acknowledgment message. For example, control circuitry 504 may determine that the receipt time is 10:30:30 am. From 910, process 900 proceeds to 912 where control circuitry 504 determines the latency based on the difference between the first time and the receipt time of the second acknowledgment message. For example, control circuitry 504 of the smartphone may determine that a message sent to the smart television via server 606 takes 30 seconds to execute.

In response to determining that the second acknowledgment message was not received, process 900 proceeds to 914 where control circuitry 504 determines the latency based on the difference between the first time and the second time. For example, control circuitry 504 may rely on the receipt time of the acknowledgement message from the server to determine that the server takes approximately 10 seconds to respond to a message.

Figure 10:
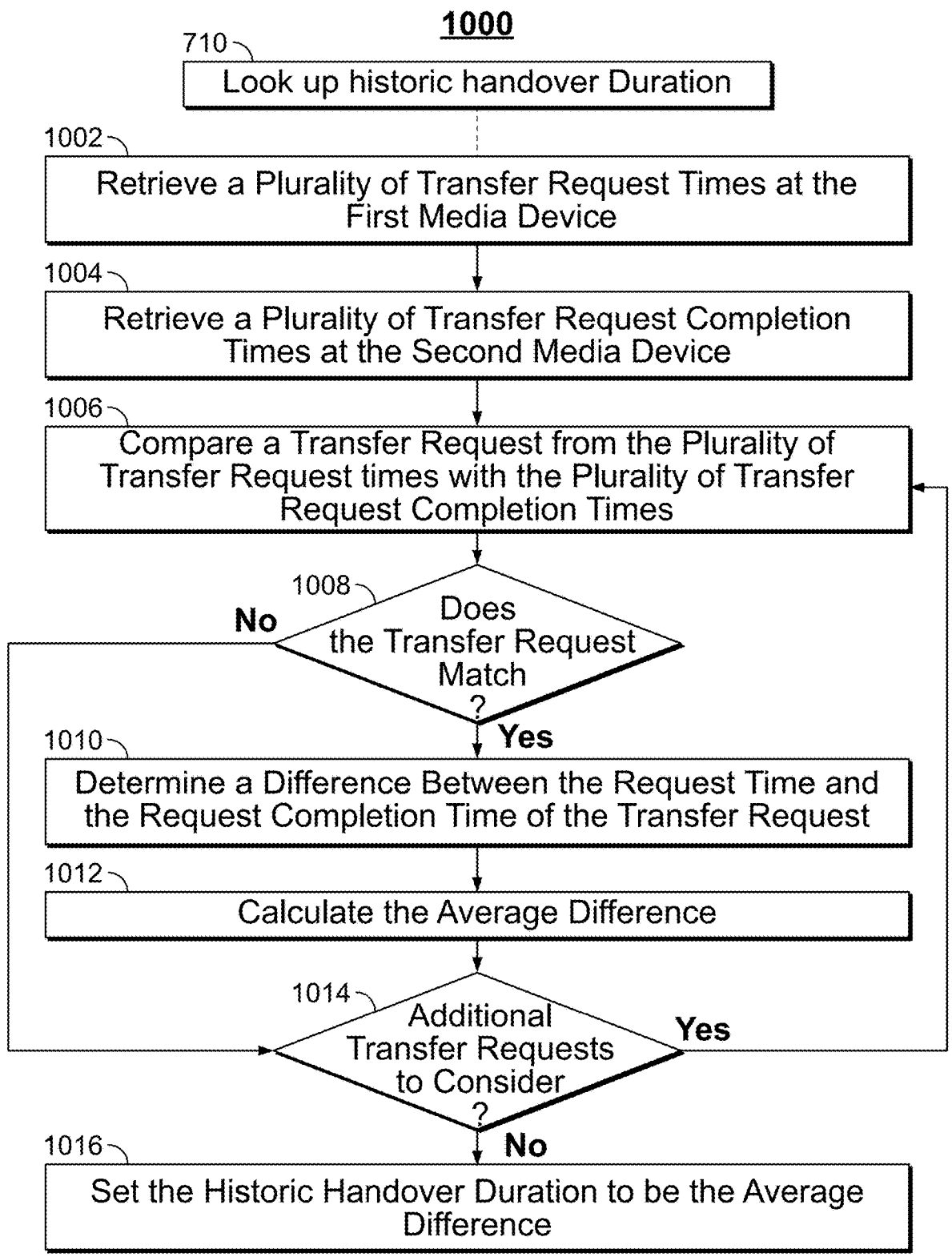
FIG. 10 is a flowchart of an illustrative process for determining the historic handover duration, in accordance with some embodiments of the disclosure.

FIG. 10 is a flowchart of illustrative process 1000 for determining the historic handover duration, in accordance with some embodiments of the disclosure. Process 1000 elaborates on 710 on FIG. 7. At 1002, control circuitry 504 retrieves a plurality of transfer request times from storage 508 at the first media device or any server with this information. For example, control circuitry 504 may retrieve a data structure that indicates, for a plurality of transfer requests, an identifier of a transfer request (e.g., request to transfer video 1) and a corresponding transfer request time (e.g. 11:51:00 am).

At 1004, control circuitry 504 of the first media device (e.g., media device 306) retrieves a plurality of transfer request completion times from storage 508 at the second media device or any server with this information. For example, control circuitry 504 may retrieve another data structure from the second media device indicating an identifier of a transfer request (e.g., request to transfer video 1) and a corresponding transfer request completion time (e.g., 11:51:30 am). At 1006, control circuitry 504 compares a transfer request from the plurality of transfer request times with the plurality of transfer request completion times. For example, control circuitry 504 may determine whether the request to transfer video 1 is found in both data structures. At 1008, control circuitry 504 determines, based on the comparison at 1006, whether the transfer request associated with a request time matches the transfer request associated with a completion time. For example, control circuitry 504 may determine that the request to transfer video 1 and the completion of the request to transfer video 1, from each respective data structure, refer to the same transfer session.

In response to determining that the transfer request matches, at 1010, control circuitry 504 determines a difference between the request time and the request completion time of the transfer request. For example, control circuitry 504 determines that the request completion time occurred 30 seconds after the request time. At 1012, control circuitry 504 calculates the average difference. For example, control circuitry 504 may identify multiple transfer requests that have request times and completion times from the same session. Accordingly, control circuitry 504 determines the differences for each transfer request and completion pair and calculates the average difference based on the individual values. In some embodiments, rather than determining an average, control circuitry 504 may perform a different computation (e.g., normalization, median determination, etc.).

In response to determining that the transfer request does not match, process 1000 proceeds to 1014, where control circuitry 504 determines whether there are additional transfer requests in the plurality of transfer request times to consider. If there are additional transfer requests to consider, control circuitry 504 selects a different transfer request and returns to processes 1000 to 1006. If all transfer requests have been considered, at 1016 control circuitry 504 sets the historic handover duration to be the average difference. For example, after determining matches in transfer request sessions across the data structures, control circuitry 504 of the first media device (e.g., media device 306) sets the historic handover duration to the final average difference (e.g., 30 seconds).

Figure 11:
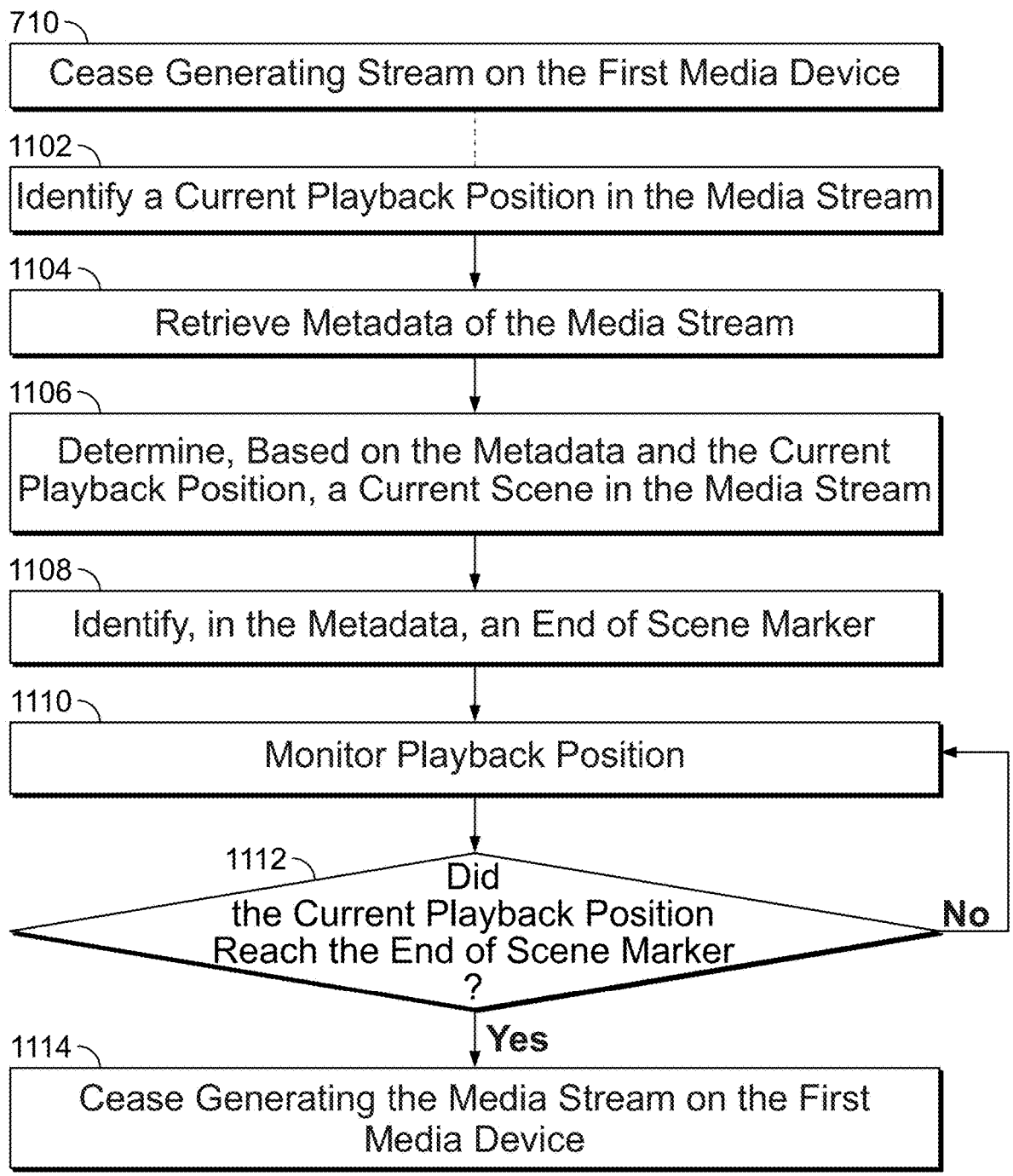
FIG. 11 is a flowchart of an illustrative process for ceasing generation of the media stream for display on the first media device at the end of a scene, in accordance with some embodiments of the disclosure.

FIG. 11 is a flowchart of illustrative process 1100 for ceasing generation of the media stream for display on the first media device at the end of a scene, in accordance with some embodiments of the disclosure. Process 1100 elaborates on 710 of FIG. 7. At 1102, control circuitry 504 identifies a current playback position in the media stream. For example, control circuitry 504 may determine that at the time when the request to transfer the movie trailer was received, the playback position was 12 seconds into the trailer. At 1104, control circuitry 504 retrieves metadata of the media stream from server 606 via communication network 604. As noted previously, the metadata may be provided by the media content source (e.g., YouTube, Marvel™ Studios, etc.) and includes information such as segment durations and markers of importance. At 1106, control circuitry 504 determines, based on the metadata and the current playback position, a current scene in the media stream. For example, cccc determines that the current playback position is 12 seconds from the beginning of the trailer, and segment 2 of FIG. 2 has a start playback position of 10 seconds and an end playback time of 20 seconds. Based on these playback boundaries, control circuitry 504 determines that the current scene in the media stream is segment 2.

At 1108, control circuitry 504 identifies, in the metadata, an end-of-scene marker. For example, segment 1 and segment 2 may both be 10 seconds long in duration. The end-of-scene marker, which indicates the playback position when a segment ends, is the 20-second marker in the trailer. At 1110, control circuitry 504 monitors playback position. For example, playback of the trailer may continue on the smartphone despite receiving the user's request to transfer viewing to the smart television. At 1112, control circuitry 504 determines whether the current playback position has reached the end-of-scene marker. For example, when the playback position reaches 20 seconds on the smartphone, control circuitry 504 determines that playback has reached the end of the segment that the user is viewing. In response to determining that the current playback position has reached the end-of-scene marker, at 1114, control circuitry 504 ceases generating the media stream for display on the first media device. If the current playback position has not reached the end of scene marker, control circuitry 504 continues to monitor the playback position at 1110.

Figure 12:
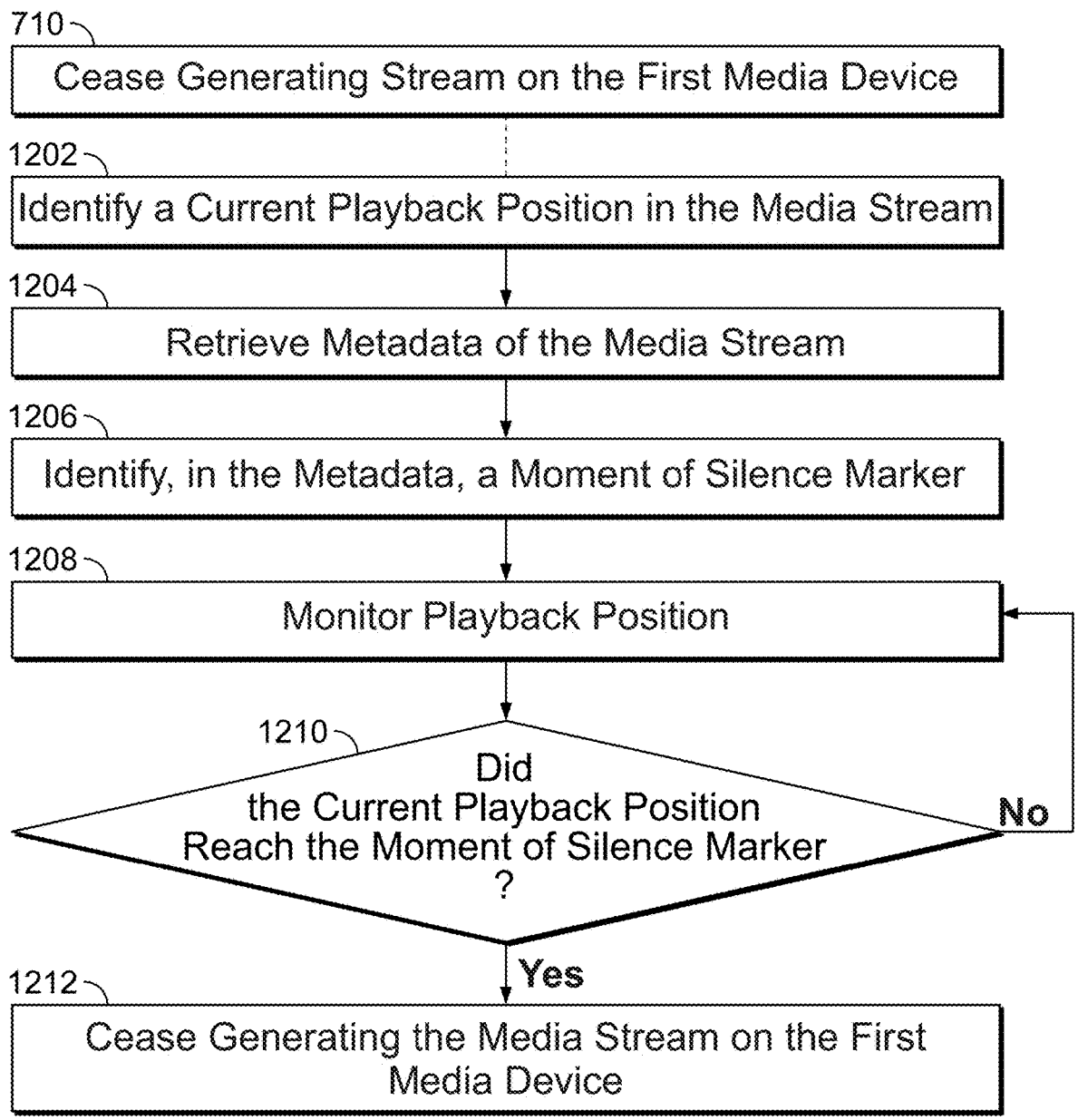
FIG. 12 is a flowchart of an illustrative process for ceasing generation of the media stream for display on the first media device at a moment of silence, in accordance with some embodiments of the disclosure.

FIG. 12 is a flowchart of illustrative process 1200 for ceasing generation of the media stream for display on the first media device at a moment of silence, in accordance with some embodiments of the disclosure. Process 1200 elaborates on 710 of FIG. 7. At 1202, control circuitry 504 identifies a current playback position in the media stream. At 1204, control circuitry 504 retrieves metadata of the media stream. At 1206, control circuitry 504 identifies a moment-of-silence marker in the metadata. For example, the user may be viewing segment 2 of the movie trailer. The metadata of the movie trailer may indicate that the volume of the movie trailer decreases by a threshold percentage relative to the average volume in the trailer. This may be an indication of the completion of a scene or dialogue. Suppose that the decrease in volume is expected at the 15-second mark in the movie trailer as noted in the retrieved metadata. At 1208, control circuitry 504 monitors playback position of the media stream.

At 1210, control circuitry 504 determines whether the current playback position has reached the moment-of-silence marker. In response to determining that the current playback position has not reached the moment-of-silence marker, process 1200 returns to 1208 where control circuitry 504 continues to monitor the playback position. In response to determining that the playback position has reached the moment-of-silence marker, control circuitry 504 ceases generating the media stream for display on the first media device at 1212. For example, when the playback position reaches the 15-second mark in the movie trailer, control circuitry 504 determines that the display of the movie trailer can be ended without seeming abrupt.

Figure 13:
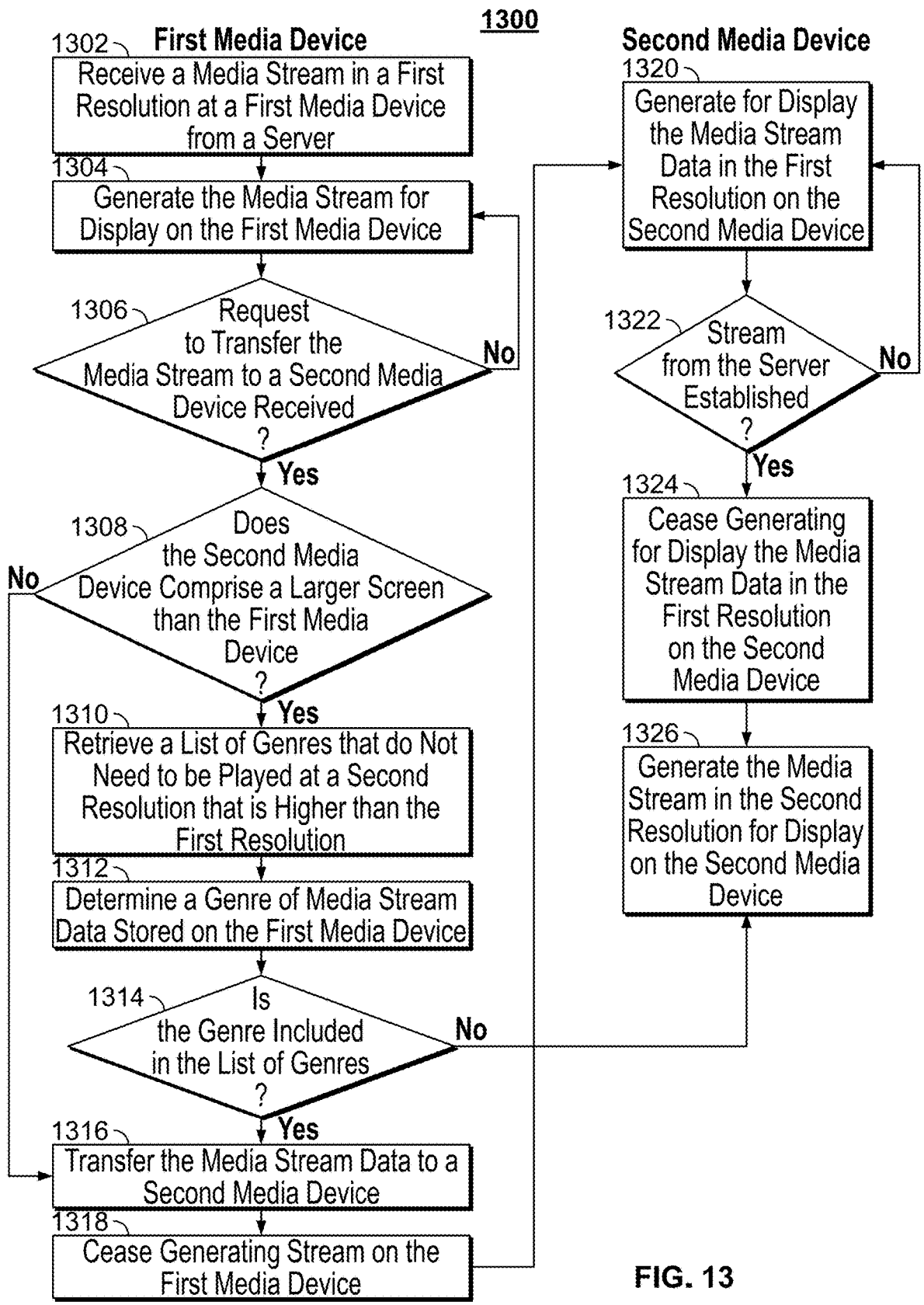
FIG. 13 is a flowchart of an illustrative process for a media content handoff in which media stream data is transferred in a first resolution from a first media device to a second media device, in accordance with some embodiments of the disclosure.

FIG. 13 is a flowchart of illustrative process 1300 for a media content handoff in which media stream data is transferred in a first resolution from a first media device to a second media device, in accordance with some embodiments of the disclosure. At 1302, control circuitry 504 of a first media device receives a media stream (e.g., media stream 402) in a first resolution from server 606 over communication network 604 (e.g., the Internet). At 1304, control circuitry 504 generates the media stream for display on the first media device. For example, the user may be streaming a video titled "Captain Marvel Trailer" on his/her smartphone's YouTube mobile application. At 1306, control circuitry 504 determines whether a request to transfer the media stream to a second media device has been received. In response to determining that the request to transfer the media stream to the second media device has been received, control circuitry 504 determines whether the second media device has a larger screen than the first media device at 1308.

Control circuitry 504 retrieves device specifications for the particular device models of the first media device (e.g., the smartphone) and the second media device (e.g., the smart television). Based on the device specifications, control circuitry 504 determines and compares the display sizes for each device. For example, the smartphone may have a display size of 4.6 inches diagonally and the smart TV may have a 50-inch display size. If a request to transfer is not received, control circuitry 504 continues to generate the media stream for display on the first media device.

If, at 1308, control circuitry 504 determines that the second media device does have a larger screen than the first media device, control circuitry 504 retrieves a list of genres that do not need to be played at a second resolution that is higher than the first resolution. For example, control circuitry 504 determines that the display size of the smart television is larger than the display size of the smartphone. Due to the larger screen size, simply sending video data buffered on the smartphone may not lead to a high-quality video being generated on the smart television. Control circuitry 504 thus refers to the genre associated with the buffered video as certain genres may not need to be upscaled to a higher resolution. It should be noted that the list of genres is not limited to traditional media genres such as "action," "comedy," "romance," etc. Instead a genre comprises various classifications of movies such as by actor, director, animation style, etc. For example, the list of genres may include genres such as "content directed by Michael Bay" or "content starring Johnny Depp." The list of genres may also include sub-genres such as "action segment directed by Michael Bay" as different content producers are associated with their own signature visuals.

At 1312, control circuitry 504 determines a genre of the media stream data stored in storage 508 of the first media device. For example, control circuitry 504 may determine that the buffered data that has not been viewed by the user features segments associated with the drama genre. This is further discussed in FIG. 14. At 1314, control circuitry 504 determines whether the genre of the media stream data is in the list of genres. For example, the list of genres may include a drama genre. In response to determining that the genre is not in the list of genres, process 1300 advances to 1326. In response to determining that the genre is in the list of genres, at 1316, control circuitry 504 transfers the media stream data to a second media device. For example, because the drama genre is in the list of genres, control circuitry 504 determines that the media stream data (e.g., buffered video data of unviewed segments) can be viewed on a larger screen without any resolution upscaling because the visual details in the frames of drama genre segments are discernable even in low-resolution videos. If for example the genre of the media stream data is "action" instead of "drama," and "action" is not in the list of genres, control circuitry 504 of the first media device will not transfer the media stream data to the second media device because the visual reproduction on the second media device may not be adequate for viewing on a large screen. In this case, the second media device establishes a network connection with a content server and directly displays the media stream.

If, at 1308, control circuitry 504 determines that the second media device does not have a larger screen than the first media device, process 1300 proceeds from 1308 to 1316 as well. At 1318, control circuitry 504 ceases generating the media stream on the first media device. It should be noted that control circuitry 504 can perform 1318 using processes 1100 and 1200.

At 1320, process 1300 moves to the second media device, and control circuitry 504 generates the media stream data for display in the first resolution on the second media device. Referring to FIG. 4, this 1320 occurs when the smartphone has transferred media stream data 404 (comprising segments F2, F3, and F4) to the smart television over a local network connection. Thus, control circuitry 504 of the second media device receives video data at the first resolution for playback while the second media device communicates with server 606 over communication network 604 to establish a stream. At 1322, control circuitry 504 determines whether a stream from server 606 has been established with the second media device over communication network 606. In response to determining that the stream from server 606 has not been established, process 1300 loops back to 1320.

In response to determining that the stream from server 606 has been established, at 1324, control circuitry 504 ceases generating the media stream data for display in the first resolution on the second media device. In particular, control circuitry 504 of the second media device indicates the final segment in media stream data 404 to server 606. In response to identifying the final segment in media stream data 404 (i.e., segment F4), control circuitry 504 determines the subsequent segment (i.e., segment F5) and begins streaming to the second media device from the subsequent segment. Even if media stream data 404 has not been completely viewed by the time a server connection is established, streaming from the subsequent segment allows control circuitry 504 of the second media device to generate a buffer while the user still has access to the content. In some embodiments, when performing the transition from segment F4 and F5, control circuitry 504 compares audio and video signatures of the respective segments to ensure that the playback of segment F5 begins immediately after segment F4. At 1326, control circuitry 504 generates the media stream in the second resolution for display on the second media device. For example, once segment F4 has completed playback on the second media device, control circuitry 504 generates segment F5 at the second resolution (e.g., 4K if the television is a 4K television). In response to completing the transfer of the media stream, control circuitry 504 may generate for display an indication on both media devices that the transfer was successful.

Figure 14:
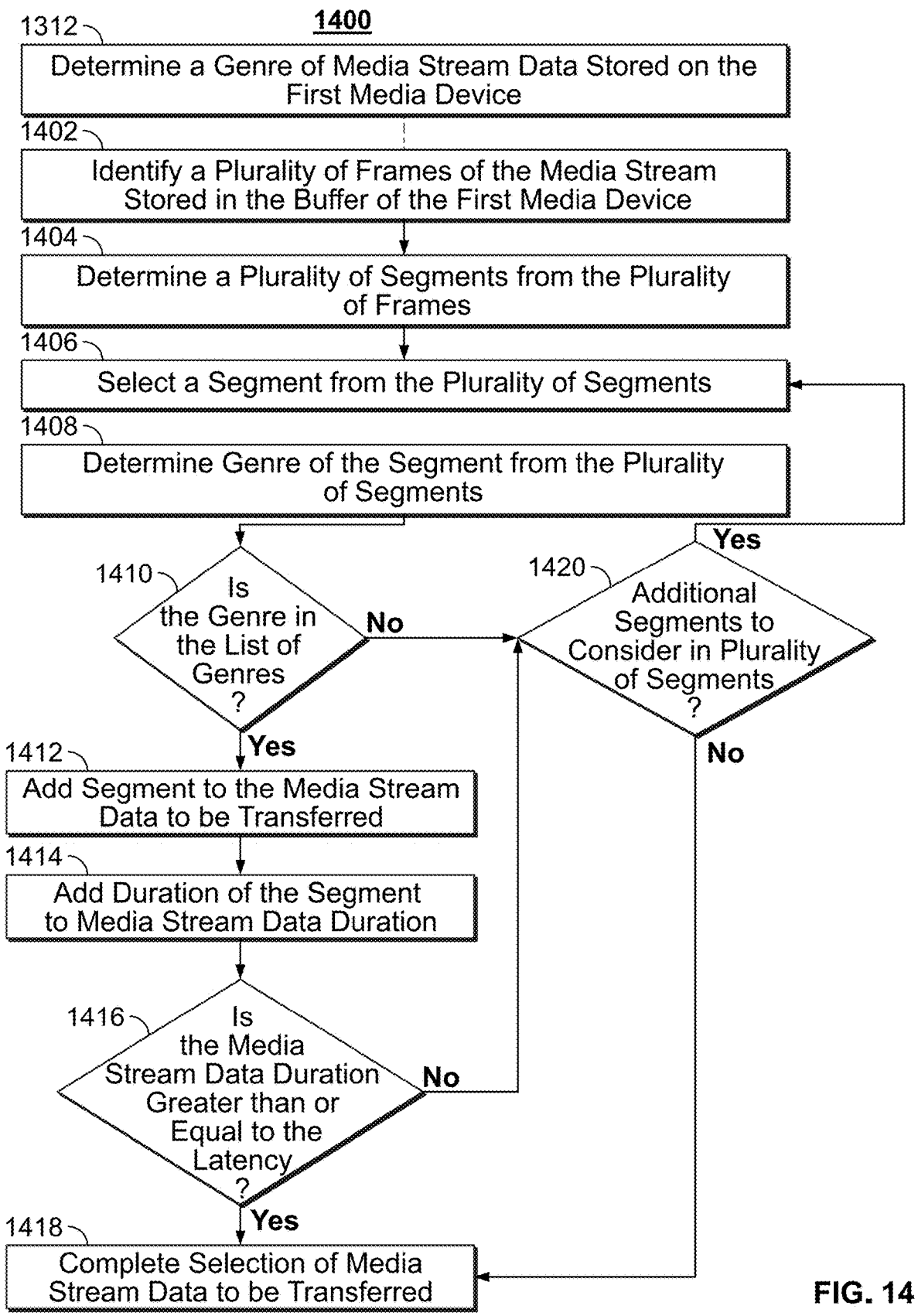
FIG. 14 is a flowchart of an illustrative process for determining whether the genre of the media stream data is in the list of genres, in accordance with some embodiments of the disclosure.

FIG. 14 is a flowchart of illustrative process 1400 for determining whether the genre of the media stream data is in the list of genres, in accordance with some embodiments of the disclosure. Process 1400 elaborates on 1312 of FIG. 13. At 1402, control circuitry 504 identifies a plurality of frames of the media stream stored in the buffer of the first media device (e.g., in storage 508). At 1404, control circuitry 504 determines a plurality of segments from the plurality of frames. For example, control circuitry 504 may retrieve metadata that indicates the segments that various frames belong to. At 1406, control circuitry 504 selects a segment from the plurality of segments. At 1408, control circuitry 504 determines a genre of the segment from the plurality of segments. For example, control circuitry 504 determines that the genre of a particular segment is "drama." At 1410, control circuitry 504 determines whether the genre is in the list of genres.

In response to determining that the genre of the segment is in the list of genres (e.g., "drama" is in the list), at 1412, control circuitry 504 adds the selected segment to the media stream data to be transferred. At 1414, control circuitry 504 adds the duration of the selected segment (e.g., 10 seconds) to the media stream data duration. At 1416, control circuitry 504 determines whether the media stream data duration is greater than or equal to an expected latency between the receipt time of the transfer request and the generation of the media stream on the second media device or a history handover duration. It should be noted that control circuitry 504 can determine the expected latency using process 900 and can determine the historic handover duration using process 1000. In response to determining that the media data duration is not greater than or equal to the latency, control circuitry 504 determines, at 1420, whether there are other segments to consider for addition into the media stream data.

At 1420, if control circuitry 504 determines that there are additional segments that have not already been considered through 1408-1414, process 1400 returns to 1406 where another segment in the plurality of segments is selected. If, at 1410, control circuitry 504 determines the genre of the segment is not in the list of genres, control circuitry 504 does not add the segment to the media stream data and process 1400 proceeds to 1420. In response to determining at 1416 that the media stream data duration is greater than or equal to the latency, control circuitry 504 completes selection of the media stream data to be transferred from the first media device to the second media device.

It should be noted that processes 700-1400 or any step thereof could be performed on, or provided by, any of the devices shown in FIGS. 5-6. For example, the processes may be executed by control circuitry 504 (FIG. 5) as instructed by a media player client implemented on media device 602 and/or server 606. In addition, one or more steps of a process may be incorporated into or combined with one or more steps of any other process or embodiment (e.g., steps from process 900 may be combined with steps from process 1100). In addition, the steps and descriptions described in relation to FIGS. 7-14 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. In addition, the systems and methods described herein may be performed in real time. It should also be noted, the systems and/or methods described above may be applied to, or used in accordance with, other systems and/or methods.

What is claimed is:

1. A method for handing off media content, the method comprising:
 receiving, at a first media device, a media stream in a first resolution from a server;
 determining, based on media stream data, a genre corresponding to the media stream;
 generating the media stream for display using the first media device;
 receiving a request to transfer the media stream to a second media device;
 determining whether the second media device comprises a screen that is larger than the first media device, wherein the determining is based on a comparison of respective device specifications for each of the first media device and second media device; and
 in response to determining that the second media device comprises a larger screen than the first media device based on the comparison of the respective device specifications:
  retrieving, from memory, a list of genres that do not need to be played at a second resolution that is higher than the first resolution, wherein the second resolution requires a second bandwidth to enable transferring media stream data that is higher than a first bandwidth required to enable transferring media stream data in the first resolution;
  comparing the genre corresponding to the media stream to the list of genres;
  in response to determining the genre corresponding to the media stream does not match a genre on the list of genres, comparing the bandwidth of a first communication stream between the first media device and the second media device to the second bandwidth; and
  in response to determining that the bandwidth of the first communication stream is less than the second bandwidth, transferring, from the first media device, the media stream data in the first resolution to the second media device until a bandwidth of a second communication stream between the second media device and the server matches or exceeds the second bandwidth.

2. The method of claim 1, the method further comprising:
 generating for display the media stream data in the first resolution on the second media device; and
 in response to determining that the media stream is ready to be generated for display on the second media device:
  ceasing the generation for display of the media stream data; and
  generating for display the media stream in the second resolution received from the server on the second media device.

3. The method of claim 1,
 wherein the media stream at the first media device is received from the server via Internet; and
 wherein the media stream data is transferred to the second media device via a local network.

4. The method of claim 1, the method further comprising:
 in response to receiving the request to transfer the media stream to the second media device, ceasing generating the media stream for display on the first media device.

5. The method of claim 1, wherein determining whether the second media device comprises a screen that is larger than the first media device comprises:
 determining a first display size of the first media device and a second display size of the second media device; and
 determining, based on comparing the first display size and the second display size, that the second media device comprises the larger screen than the first media device.

6. The method of claim 1, the method further comprising:
 receiving latency data of a connection between the server and the second media device;
 estimating, based on the latency data, a period of time between the request to transfer the media stream to the second media device and the second media device beginning to receive the media stream from the server; and
 generating, for display on the second media device, the media stream in the first resolution for a duration equal to the estimated period of time.

7. The method of claim 1, the method further comprising:
accessing historical data indicating the average length of time between historical requests to transfer media streams to the second media device and generation for display of the media streams on the second media device; and
generating, for display on the second media device, the media stream in the first resolution for a duration equal to the average length of time.

8. The method of claim 1, the method further comprising:
in response to receiving the request to transfer the media stream to the second media device, identifying an end of a current scene in the media stream; and
ceasing generating the media stream for display on the first media device in response to reaching playback of the end of the current scene.

9. The method of claim 1, the method further comprising:
in response to receiving the request to transfer the media stream to the second media device, identifying a moment of silence in the media stream; and
ceasing generating the media stream for display on the first media device in response to reaching playback of the moment of silence.

10. The method of claim 1, wherein the second resolution is associated with the larger screen of the second media device.

11. A system for handing off media content, the system comprising:
memory; and
control circuitry configured to:
receive, at a first media device, a media stream in a first resolution from a server;
determine, based on media stream data, a genre corresponding to the media stream;
generate the media stream for display using the first media device;
receive a request to transfer the media stream to a second media device;
determine whether the second media device comprises a screen that is larger than the first media device, wherein the determining is based on a comparison of respective device specifications for each of the first media device and second media device; and
in response to determining that the second media device comprises a larger screen than the first media device based on the comparison of the respective device specifications:
retrieve, from the memory, a list of genres that do not need to be played at a second resolution that is higher than the first resolution, wherein the second resolution requires a second bandwidth to enable transferring media stream data that is higher than a first bandwidth required to enable transferring media stream data in the first resolution;
compare the genre corresponding to the media stream to the list of genres;
in response to determining the genre corresponding to the media stream does not match a genre on the list of genres, compare the bandwidth of a first communication stream between the first media device and the second media device to the second bandwidth;
in response to determining that the bandwidth of the first communication stream is less than the second bandwidth, transfer, from the first media device, the media stream in the first resolution to the second media device until a bandwidth of a second communication stream between the second media device and the server matches or exceeds the second bandwidth.

12. The system of claim 11, wherein the control circuitry is further configured to:
generate for display the media stream data in the first resolution on the second media device; and
in response to determining that the media stream is ready to be generated for display on the second media device:
cease the generation for display of the media stream data; and
generate for display the media stream in the second resolution received from the server on the second media device.

13. The system of claim 11,
wherein the media stream at the first media device is received from the server via Internet; and
wherein the media stream data is transferred to the second media device via a local network.

14. The system of claim 11, wherein the control circuitry is further configured to:
in response to receiving the request to transfer the media stream to the second media device, cease generating the media stream for display on the first media device.

15. The system of claim 11, wherein the control circuitry is configured to determine whether the second media device comprises a screen that is larger than the first media device by:
determining a first display size of the first media device and a second display size of the second media device; and
determining, based on comparing the first display size and the second display size, that the second media device comprises the larger screen than the first media device.

16. The system of claim 11, wherein the control circuitry is further configured to:
receive latency data of a connection between the server and the second media device;
estimate, based on the latency data, a period of time between the request to transfer the media stream to the second media device and the second media device beginning to receive the media stream from the server; and
generate, for display on the second media device, the media stream in the first resolution for a duration equal to the estimated period of time.

17. The system of claim 11, wherein the control circuitry is further configured to:
access historical data indicating the average length of time between historical requests to transfer media streams to the second media device and generation for display of the media streams on the second media device; and
generate, for display on the second media device, the media stream in the first resolution for a duration equal to the average length of time.

18. The system of claim 11, wherein the control circuitry is further configured to:
in response to receiving the request to transfer the media stream to the second media device, identify an end of a current scene in the media stream; and
cease generating the media stream for display on the first media device in response to reaching playback of the end of the current scene.

19. The system of claim 11, wherein the control circuitry is further configured to:
in response to receiving the request to transfer the media stream to the second media device, identify a moment of silence in the media stream; and
cease generating the media stream for display on the first media device in response to reaching playback of the moment of silence.

20. The system of claim 11, wherein the second resolution is associated with the larger screen of the second media device.

* * * * *